US011968372B2

(12) United States Patent
Hamilton et al.

(10) Patent No.: US 11,968,372 B2
(45) Date of Patent: Apr. 23, 2024

(54) LAYERED SCENE DECOMPOSITION CODEC METHOD

(71) Applicant: Avalon Holographics Inc., St. John's (CA)

(72) Inventors: Matthew Hamilton, St. John's (CA); Chuck Rumbolt, St. John's (CA); Donovan Benoit, St. John's (CA); Matthew Troke, St. John's (CA); Robert Lockyer, St. John's (CA)

(73) Assignee: Avalon Holographics Inc., St. John's (CA)

( * ) Notice: Subject to any disclaimer, the term of this patent is extended or adjusted under 35 U.S.C. 154(b) by 0 days.

(21) Appl. No.: 18/166,068

(22) Filed: Feb. 8, 2023

(65) Prior Publication Data

US 2023/0188725 A1    Jun. 15, 2023

Related U.S. Application Data

(63) Continuation of application No. 17/185,556, filed on Feb. 25, 2021, now Pat. No. 11,611,755, which is a
(Continued)

(51) Int. Cl.
*H04N 19/14*    (2014.01)
*G06T 3/18*    (2024.01)
(Continued)

(52) U.S. Cl.
CPC .............. *H04N 19/14* (2014.11); *G06T 3/18* (2024.01); *G06T 7/50* (2017.01); *G06T 7/586* (2017.01);
(Continued)

(58) Field of Classification Search
CPC .... H04N 19/14; H04N 19/132; H04N 19/172; H04N 19/25; H04N 13/161;
(Continued)

(56) References Cited

U.S. PATENT DOCUMENTS

2005/0185711 A1    8/2005    Pfister et al.
2015/0201176 A1*   7/2015    Graziosi .............. H04N 13/243
                                                    348/43
(Continued)

*Primary Examiner* — Chan S Park
*Assistant Examiner* — Daniel C Chang

(57) ABSTRACT

A system and methods for a CODEC driving a real-time light field display for multi-dimensional video streaming, interactive gaming and other light field display applications is provided applying a layered scene decomposition strategy. Multi-dimensional scene data is divided into a plurality of data layers of increasing depths as the distance between a given layer and the plane of the display increases. Data layers are sampled using a plenoptic sampling scheme and rendered using hybrid rendering, such as perspective and oblique rendering, to encode light fields corresponding to each data layer. The resulting compressed, (layered) core representation of the multi-dimensional scene data is produced at predictable rates, reconstructed and merged at the light field display in real-time by applying view synthesis protocols, including edge adaptive interpolation, to reconstruct pixel arrays in stages (e.g. columns then rows) from reference elemental images.

14 Claims, 13 Drawing Sheets

Related U.S. Application Data continuation of application No. 16/541,534, filed on Aug. 15, 2019, now Pat. No. 10,972,737, which is a continuation of application No. 15/683,992, filed on Aug. 23, 2017, now Pat. No. 10,432,944.

(51) Int. Cl.
| | | |
|---|---|---|
| *G06T 7/50* | (2017.01) | |
| *G06T 7/586* | (2017.01) | |
| *G06T 7/593* | (2017.01) | |
| *G06T 15/06* | (2011.01) | |
| *H04L 65/70* | (2022.01) | |
| *H04N 13/161* | (2018.01) | |
| *H04N 13/194* | (2018.01) | |
| *H04N 13/302* | (2018.01) | |
| *H04N 19/132* | (2014.01) | |
| *H04N 19/172* | (2014.01) | |
| *H04N 19/182* | (2014.01) | |
| *H04N 19/184* | (2014.01) | |
| *H04N 19/25* | (2014.01) | |
| *H04N 19/597* | (2014.01) | |

(52) U.S. Cl.
CPC .............. *G06T 7/593* (2017.01); *H04L 65/70* (2022.05); *H04N 19/132* (2014.11); *H04N 19/172* (2014.11); *H04N 19/25* (2014.11); *G06T 15/06* (2013.01); *H04N 13/161* (2018.05); *H04N 13/194* (2018.05); *H04N 13/302* (2018.05); *H04N 19/182* (2014.11); *H04N 19/184* (2014.11); *H04N 19/597* (2014.11)

(58) Field of Classification Search
CPC .. H04N 13/194; H04N 13/302; H04N 19/182; H04N 19/184; H04N 19/597; G06T 3/0093; G06T 7/50; G06T 7/586; G06T 7/593; G06T 15/06; H04L 65/70
See application file for complete search history.

(56) References Cited

U.S. PATENT DOCUMENTS

| | | | |
|---|---|---|---|
| 2015/0269736 A1* | 9/2015 | Hannuksela | H04N 13/161 345/419 |
| 2015/0277378 A1* | 10/2015 | Smithwick | G03H 1/0808 359/9 |
| 2016/0173883 A1* | 6/2016 | Lawrence | H04N 19/117 348/46 |
| 2017/0034530 A1 | 2/2017 | Cherepanov et al. | |
| 2018/0276875 A1* | 9/2018 | Pylvaenaeinen | G06T 17/00 |
| 2018/0322683 A1* | 11/2018 | Dimitrov | G06F 3/1431 |

* cited by examiner

LAYERED SCENE DECOMPOSITION CODEC METHOD

CLAIM OF PRIORITY

This patent is a continuation of and claims the benefit of U.S. Non-Provisional application Ser. No. 17/185,556 filed on 25 Feb. 2021, which is a continuation of U.S. Non-Provisional application Ser. No. 16/541,534 filed on Aug. 15, 2019 and published as US20190373265A1 on Dec. 5, 2019 and granted as U.S. Pat. No. 10,972,737 on Oct. 4, 2021, which is a continuation of U.S. Non-Provisional application Ser. No. 15/683,992 filed on Aug. 23, 2017 and granted as U.S. Pat. No. 10,432,944 on Oct. 1, 2019, the entire contents of all of which are hereby expressly incorporated by reference herein in their entirety.

FIELD OF THE INVENTION

The present disclosure relates to image (light-field) data encoding and decoding, including data compression and decompression systems and methods for the provision of interactive multi-dimensional content at a light field display.

BACKGROUND OF THE INVENTION

Autostereoscopic, high-angular resolution, wide field of view (FOV), multi-view displays provide users with an improved visual experience. A three dimensional display that can pass the 3D Turing Test (described by Banks et al.) will require a light field representation in place of the two dimensional images projected by standard existing displays. A realistic light field representation requires enormous amounts of bandwidth to transmit the display data, which will comprise at least gigapixels of data. These bandwidth requirements currently exceed the bandwidth capabilities provided by technologies previously known in the art; the upcoming consumer video standard is 8K Ultra High-Def (UHD), which provides only 33.1 megapixels of data per display.

Compressing data for transmission is previously known in the art. Data may be compressed for various types of transmission, such as, but not limited to: long-distance transmission of data over internet or ethernet networks; or transmission of a synthetic multiple-view created by a graphical processing unit (GPU) and transferred to a display device. Such data may be used for video streaming, real-time interactive gaming, or any other light-field display.

Several CODECS for compressed light-field transmission are previously known in the art. Olsson et al. teach compression techniques where an entire light-field data set is processed to reduce redundancy and produce a compressed representation. Subcomponents (i.e., elemental images) of the light field are treated as a video sequence to exploit redundancy using standard video coding techniques. Vetro et al. teach multiple-view specializations of compression standards that exploit redundancy between the light field subcomponents to achieve better compression rates, but at the expense of more intensive processing. These techniques may not achieve a sufficient compression ratio, and when a good ratio is achieved the encoding and decoding processes are beyond real-time rates. These approaches assume that the entire light field exists in a storage disk or memory before being encoded. Therefore large light-field displays requiring large numbers of pixels introduce excessive latency when reading from a storage medium.

In an attempt to overcome hardware limitations for the delivery of multi-dimensional content in real-time, various methods and systems are known, however, these methods and systems present their own limitations.

U.S. Pat. No. 9,727,970 discloses a distributed, in parallel (multi-processor) computing method and apparatus for generating a hologram by separating 3D image data into data groups, calculating from the data groups hologram values to be displayed at different positions on the holographic plane and summing the values for each position for generating a holographic display. As a disclosure focused on generating a holographic display, the strategies applied involve manipulating fine at a smaller scale than light field and in this instance is characterized by the sorting and dividing of data according to colour, followed by colour image planes and then further dividing the plane images into sub-images.

US Patent Publication No. 20170142427 describes content adaptive light field compression based on the collapsing of multiple elemental images (hogels) into a single hogel. The disclosure describes achieving a guaranteed compression rate, however, image lossiness varies and in combining hogels as disclosed there is no guarantee of redundancy that can be exploited.

US Patent Publication No. 20160360177 describes methods for full parallax compressed light field synthesis utilizing depth information and relates to the application of view synthesis methods for creating a light field from a set of elemental images that form a subset of a total set of elemental images. The view synthesis techniques described herein do not describe or give methods to handle reconstruction artifacts caused during backwards warping.

US Patent Publication No. 20150201176 describes methods for full parallax compressed light field 3D imaging systems disclosing the subsampling of elemental images in a light field based on the distance of the objects in the scene being captured. Though the methods describe the possibility of downsampling the light field using simple conditions that could enhance the speed of encoding, in the worse case 3D scenes exist where no down-sampling would occur and the encoding would fall back on transform encoding techniques which rely on having the entire light field to exist prior to encoding.

There remains a need for increased data transmission capabilities, improved data encoder-decoders (CODECs), and methods to achieve both improved data transmission and CODEC capabilities for the real-time delivery of multi-dimensional content to a light field display.

SUMMARY OF THE INVENTION

The present invention relates generally to 3D image data encoding and decoding for driving a light field display in real-time, which overcomes or can be implemented with present hardware limitations.

It is an object of the present disclosure to provide a CODEC with reduced system transmission latency and high bandwidth rates to provide for the production of a light field, in real time, with good resolution, at a light field display, for application in video streaming, and real-time interactive gaming. Light field or 3D scene data is deconstructed into layers (corresponding to layered light fields), sampled and rendered to compress the data for transmission and then decoded to construct and merge light fields corresponding to the data layers at a light field display.

According to one aspect there is provided a computer-implemented method comprising the steps of:
i. receiving from a source a data set comprising light field data or a 3D description of a scene;
ii. partitioning said data set into a plurality of data layers, each data layer comprising elemental image content; and
iii. sampling and rendering each data layer of the plurality of data layers to encode a light field corresponding to each data layer and produce a set of compressed data encoding a set of light fields.

In one embodiment of the method, the partitioning of the data set into a plurality of data layers is implemented according to a layering scheme to facilitate the encoding of the set of light fields as a distribution of light fields arranged such that the depth of each light field increases as the distance between said light field and a display surface increases. In a related embodiment, the depth of each light field increases exponentially.

In another embodiment of the method, the sampling of each data layer of said plurality of data layers is implemented according to one or more plenoptic sampling schemes specifying, for each light field corresponding to each data layer, reference elemental images sampled from the elemental image content of each data layer.

In still a further embodiment of the method, the rendering of a data layer is executed by applying a rendering technique selected to efficiently encode the light field corresponding to said data layer. In related embodiments, the rendering technique selected may be a perspective rendering, oblique rendering, or ray casting technique.

In one embodiment, the method further comprises the step of assigning a variable fractional bit representation to each data layer of the plurality of data layers to optimize compression of the data set.

In yet another embodiment, the method further comprises the steps of transmitting and decoding the set of compressed data to construct the set of light fields. In one related embodiment, the step of transmitting the compressed data is performed using a 2D display cable.

In a further related embodiment of the method, the step of decoding the set of compressed data is implemented by executing a view synthesis protocol for each data layer sampled and rendered to encode the light field corresponding to each data layer. In other related embodiments, each view synthesis protocol comprises instructions the multi-stage reconstruction of a pixel array from reference elemental images used to construct the light field corresponding to each data layer. The multi-stage reconstruction of the pixel array is performed in a first stage by column decoding and in a second stage by row decoding, or alternatively in a first stage by row decoding and in a second stage by column decoding.

In still another embodiment of the method, one or more of the view synthesis protocols is executed with the application of edge adaptive interpolation to optimize the reconstruction of the pixel array.

In one embodiment, the method further comprises the step of merging the light fields in the set of light fields to produce a display light field at a display. To produce the display light field, the set of compressed data is used to produce a core encoded representation of the display light field. In a related embodiment, method still further comprises the steps of encoding and compressing a residue encoded representation of the display light field. The core and residue encoded representations of the set of light fields can be used to produce the display light field. In illustrative embodiments, the display light field represents a frustum volume of the display, or alternatively an inner frustum and an outer frustum volume of the display.

According to another aspect there is provided a computer-implemented system comprising:
a source for a data set a data set comprising light field data or a 3D description of a scene;
an encoder in communication with said source, comprising one or more processors configured to:
i. partition the data set received from said source into a plurality of data layers, each data layer comprising elemental image content; and
ii. sample and render each data layer of the plurality of data layers to encode a light field corresponding to each data layer and produce a set of compressed data encoding a set of light fields;
a means for transmitting the set of compressed data from the encoder to a decoder; and
a decoder comprising one or more processors configured to decode the set of compressed data to construct a set of light fields.

In one embodiment of the system, the one or more processors of the encoder partition the data set into a plurality of data layers by implementing a layering scheme to facilitate the encoding of the set of light fields as a distribution of light fields arranged such that the depth of each light field increases as the distance between said light field and a display surface increases. In a related embodiment, the depth of each light field increases exponentially.

In another embodiment of the system, the one or more processors of the encoder sample of each data layer of said plurality of data layers by implementing one or more plenoptic sampling schemes specifying, for each light field corresponding to each data layer, reference elemental images sampled from the elemental image content of each data layer.

In still a further embodiment of the system, the one or more processors of the encoder render each data layer by executing by applying a rendering technique selected to efficiently encode the light field corresponding to said data layer. In related embodiments the rendering technique selected may be a perspective rendering, oblique rendering, or ray casting technique.

In one embodiment of the system, the one or more processors of the encoder are further configured to assign a variable fractional bit representation to each data layer of the plurality of data layers to optimize compression of the data set.

In yet another embodiment of the system, the transmission means is a 2D display cable.

In a further related embodiment of the system, the one or more processors of the decoder implement the decoding of the set of compressed data by executing a view synthesis protocol for each data layer sampled and rendered to encode the light field corresponding to each data layer. In other related embodiments, each view synthesis protocol comprises instructions the multi-stage reconstruction of a pixel array from reference elemental images used to construct the light field corresponding to each data layer. The multi-stage reconstruction of the pixel array is performed in a first stage by column decoding and in a second stage by row decoding, or alternatively in a first stage by row decoding and in a second stage by column decoding.

In still another embodiment of the system, one or more of the view synthesis protocols is executed with the application of edge adaptive interpolation to optimize the reconstruction of the pixel array.

In one embodiment of the system, the one or more processors of the decoder are further configured to merge the light fields in the set of light fields to produce a display light field at a display. To produce the display light field, the set of compressed data is used to produce a core encoded representation of the display light field. In a related embodiment, method still further comprises the steps of encoding and compressing a residue encoded representation of the display light field. The core and residue encoded representations of the set of light fields can be used to produce the display light field. In illustrative embodiments, the display light field represents a frustum volume of the display, or alternatively an inner frustum and an outer frustum volume of the display.

According to a further aspect, there is provided a computer-implemented system comprising one or more processors and one or more memory components comprising instructions configured to cause the one or more processors to perform a method comprising the steps of:
  i. receiving from a source a data set comprising light field data or a 3D description of a scene;
  ii. partitioning said data set into a plurality of data layers, each data layer comprising elemental image content; and
  iii. sampling and rendering each data layer of the plurality of data layers to encode a light field corresponding to each data layer and produce a set of compressed data encoding a set of light fields.

According to yet another aspect, there is provided a non-transitory, computer readable medium comprising instructions configured to cause the one or more processors to perform a method comprising the steps of:
  i. receiving from a source a data set comprising light field data or a 3D description of a scene;
  ii. partitioning said data set into a plurality of data layers, each data layer comprising elemental image content; and
  iii. sampling and rendering each data layer of the plurality of data layers to encode a light field corresponding to each data layer and produce a set of compressed data encoding a set of light fields.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1:
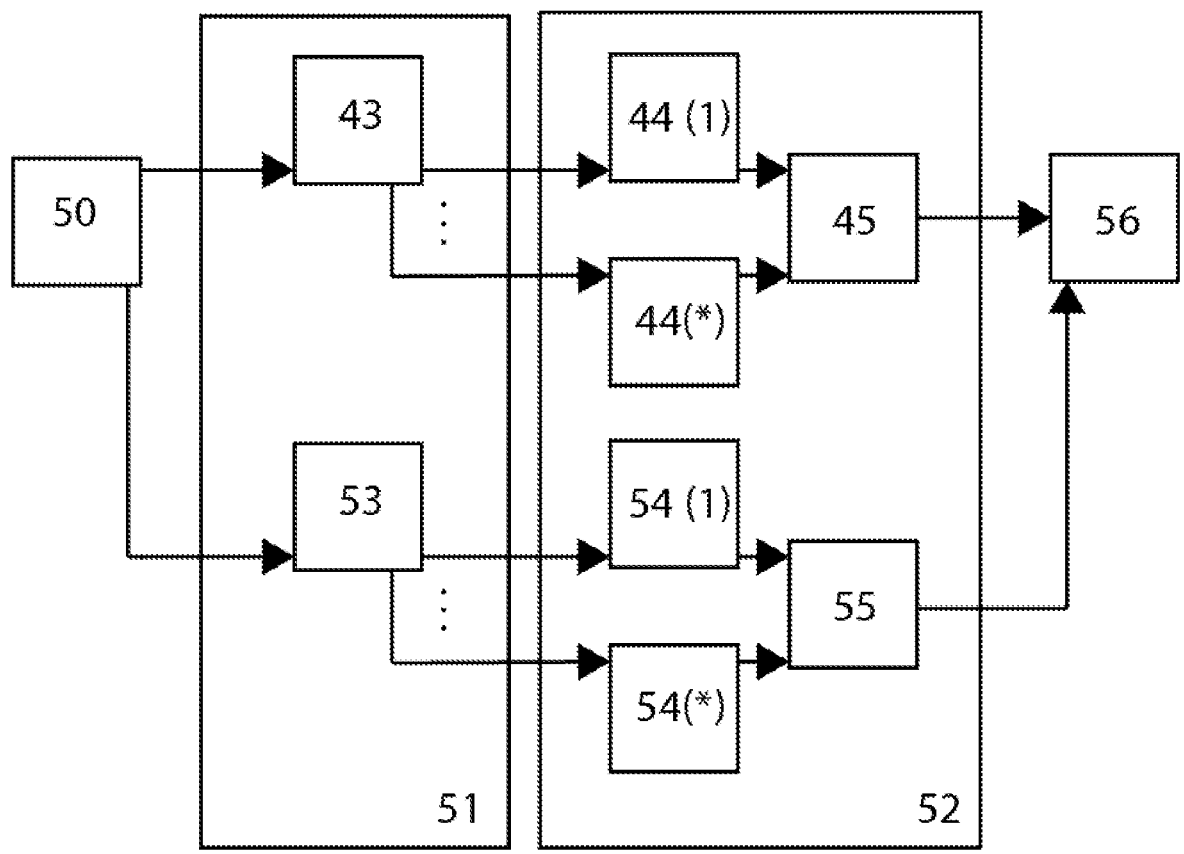
FIG. 1: is a schematic representation (block diagram) of an embodiment of a layered scene decomposition (CODEC) system according to the present disclosure.

The present invention relates generally to CODEC systems and methods for light field data or multi-dimensional scene data compression and decompression to provide for the efficient (rapid) transmission and reconstruction of a light field at a light field display.

Various features of the invention will become apparent from the following detailed description taken together with the illustrations in the Figures. The design factors, construction and use of the layered scene decomposition CODEC disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use or method, denotes that additional elements and/or method steps may be present, but that these additions do not materially affect the manner in which the recited composition, device, article, system, method or use functions. The term "consisting of" when used herein in connection with a composition, device, article, system, use or method, excludes the presence of additional elements and/or method steps. A composition, device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "pixel" refers to a light source and light emission mechanism used to create a display.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

As used herein, the term "light field display" is a device which reconstructs a light field from a finite number of light field radiance samples input to the device. The radiance samples represent the color components red, green and blue (RGB). For reconstruction in a light field display, a light field can also be understood as a mapping from a four dimensional space to a single RGB color. The four dimensions include the vertical and horizontal dimensions of the display and two dimensions describing the directional components of the light field. A light field is defined as the function:

$$LF:(x,y,u,v) \rightarrow (r,g,b)$$

For a fixed $x_f$, $y_f$, $LF(x_f, y_f, u, v)$ represents a two dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

It is contemplated that any embodiment of the compositions, devices, articles, methods and uses disclosed herein can be implemented by one skilled in the art, as is, or by making such variations or equivalents without departing from the scope and spirit of the invention.

Layered Scene Decomposition (LSD) CODEC System and Methods

The CODEC according to the present disclosure applies a strategy of drawing upon known sampling, rendering, and view synthesis methods for generating light field displays, adapting said strategies for use in conjunction with a novel layered scene decomposition strategy as disclosed herein, including its derivation, implementation and applications.

3D Displays

A conventional display as previously known in the art consists of spatial pixels substantially evenly-spaced and organized in a two-dimensional row, allowing for an idealized uniform sampling. By contrast, a three-dimensional display requires both spatial and angular samples. While the spatial sampling of a typical three-dimensional display remains uniform, the angular samples cannot necessarily be considered uniform in terms of the display's footprint in angular space. For a review of various light field parameterizations for angular ray distributions, please see U.S. Pat. No. 6,549,308.

The angular samples, also known as directional components of the light field, can be parameterized in various ways, such as the planar parameterizations taught by Gortler et. al in "The Lumigraph". When the light field function is discretized in terms of position, the light field can be understood as a regularly-spaced array of planar-parameterized pinhole projectors, as taught by Chai in "Plenoptic Sampling". For a fixed $x_f$, $y_f$ the elemental image $LF(x_f, y_f, u, v)$ represents a two dimensional image which may be understood as an image projected by a pinhole projector with an arbitrary ray parameterization. For a light field display, the continuous elemental image is represented by a finite number of light field radiance samples. For an idealized, planar parameterized pinhole projector, said finite number of samples are mapped into the image plane as a regularly-spaced array (the regular spacing within the plane does not correspond to a regular spacing in the corresponding angular directional space).

The consideration of planar parameterizations is not intended to limit the scope or spirit of the present disclosure, as the directional components of the light field can be parameterized by a variety of other arbitrary parameterizations. For example, lens distortions or other optical effects in a physically embodied pinhole projector can be modeled as distortions of the planar parameterization. In addition, display components may be defined through a warping function, such as taught by Clark et al. in "A transformation method for the reconstruction of functions from nonuniformly spaced samples."

A warping function $\alpha(u, v)$ defines a distorted planar parameterization of the pinhole projector, producing arbitrary alternate angular distributions of directional rays in the light field. The angular distribution of rays propagating from a light field pinhole projector is determined by the pinhole projector's focal length f and a corresponding two dimensional warping function $\alpha(u, v)$.

An autostereoscopic light field display projecting a light field for one or more users is defined as:

$$D=(M_x,M_y,N_u,N_v,f,a,D_{LP})$$

Where ($M_x$, $M_y$) are the horizontal and vertical dimensions of the display's spatial resolution and ($N_u$, $N_v$) are the horizontal and vertical dimensions of the display's angular resolution components. The display is an array of idealized light field projectors, with pitch $D_{LP}$, focal length f, and a warping function α defining the distribution of ray directions for the light field projected by the display.

A light field LF(x, y, u, v) driving a light field display D=($M_x$, $M_y$, $N_u$, $N_v$, f, a, $D_{LP}$) requires $M_x$ light field radiance samples in the x direction, $M_y$ light field radiance samples in the y direction, and $N_u$, and $N_v$ light field radiance samples in the u and v directions. While D is defined with a single warping function α, each of the light field planar-parameterized pinhole projectors within the array of idealized light field pinhole projectors may have a unique warping function α, if significant microlens variations exist in a practical pinhole projector causing the angular ray distribution to vary significantly from one microlens to another microlens.

Light Field Display Rendering

Figure 2:
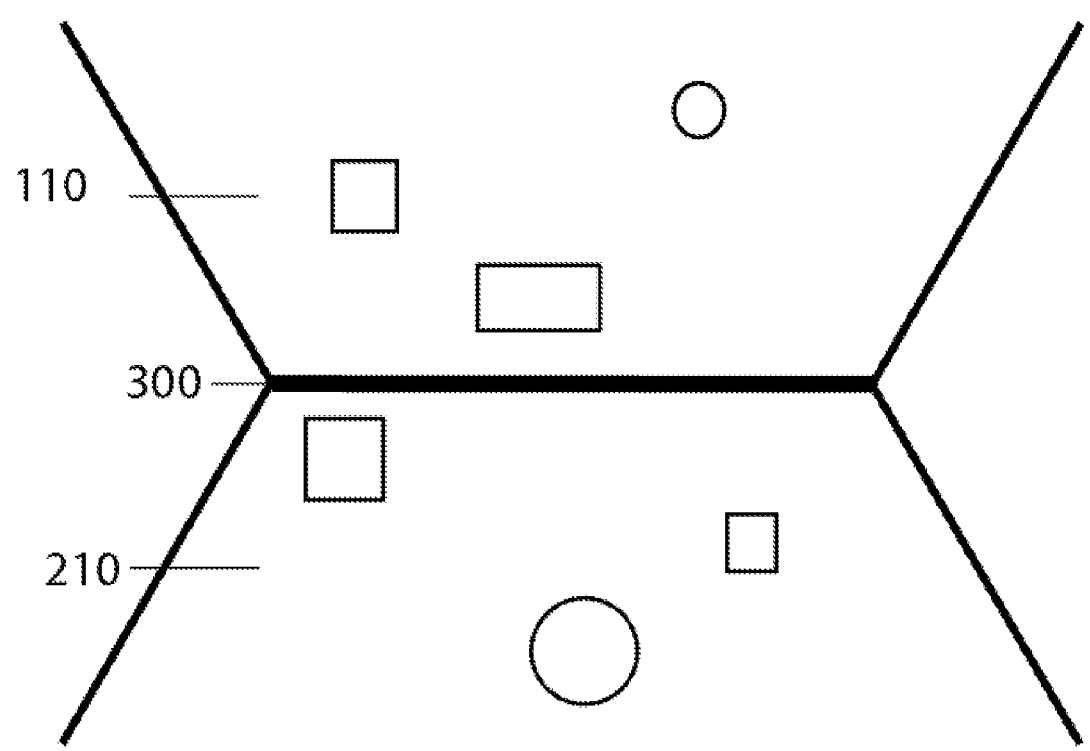
FIG. 2: is a schematic top-down view of the inner frustum volume and outer frustum volume of a light field display.

In "Fast computer graphics rendering for full parallax spatial displays," Halle et al. provide a method for rendering objects located within an inner frustum volume and outer frustum volume of the display. FIG. 2 illustrates a light field display representing objects within a volumetric region defined by these two separate viewing frusta, with the inner frustum volume (110) located behind the display surface (300) (i.e., within the display) and the outer frustum volume (210) located in front of the display surface (i.e. outside of the display). As illustrated, various objects (shown schematically as prismatic and circular shapes) are located at varying depths from the display surface (300).

Halle et al. teach a double frustum rendering technique, where the inner frustum volume and outer frustum volume are separately rendered as two distinct light fields. The inner frustum volume $LF_O$(x, y, u, v) and outer frustum volume $LF_P$(x, y, u, v) are recombined into the single light field LF(x, y, u, v) through a depth merging process.

The technique uses a pinhole camera rendering model to generate the individual elemental images of the light field. Each elemental image (i.e. each rendered planar-parameterized pinhole projector image) requires the use of two cameras: one camera to capture the inner frustum volume and one camera to capture the outer frustum volume. Halle et al. teach rendering a pinhole projector image at a sampling region of the light field using a standard orthoscopic camera and its conjugate pseudoscopic camera. For a pinhole camera C, the corresponding conjugate camera is denoted as C*.

To capture an elemental image within a light field display with projectors parameterized using warping function α, a generalized pinhole camera based on a re-parameterization of an idealized planarly-parameterized pinhole camera is used. As taught by Gortler et al., a pinhole camera C with a focal length f has light rays defined by a parameterization created by two parallel planes. Pinhole camera C captures an image $I_C$(u, v), where (u, v) are coordinates in the ray parameterization plane. The generalized pinhole camera, $C_α$, is based upon a planar parameterized camera warped using a two dimensional, continuous, invertible time-warping function, as taught by Clark et al. With a warping function α(u, v,), the inverse is y(u, v,). Therefore, the image of $C_α$, $I_{C_α}$=$I_C$(α(u,v)).

Given the generalized pinhole camera, $C_α$, a conjugate generalized camera $C_α$* is formed to complete double frustum rendering. The views generated from a $M_x$×$M_y$ grid of generalized pinhole camera pairs are rendered to render the light field for the light field display.

Therefore, the set of all generalized pinhole camera pairs that must be rendered to produce light field LF(x, y, u, v) for a given light field display D=($M_x$, $M_y$, $N_u$, $N_v$, f, a, $D_{LP}$) is defined as:

$\{(C_α, C_α^*)(x,y) | 1 \le x \le M_x, 1 \le y \le M_y\}$

A set of orthoscopic cameras (O={($C_α$(x, y)|1≤x≤$M_x$, 1≤y≤$M_y$}) capture the light field image corresponding to the inner frustum volume and a set of conjugate generalized cameras (P={($C_α$*(x, y)|1≤x≤$M_x$, 1≤y≤$M_y$}) capture the image corresponding to the outer frustum volume. As described above, the inner frustum volume and outer frustum volume are combined into a single light field.

Data Compression for Light Field Display

Piao et al. utilize a priori physical properties of a light field in order to identify redundancies in the data. The redundancies are used to discard elemental images based on the observation that elemental images representing neighboring points in space contain significant overlapped information. This avoids performing computationally complex data transforms in order to identify information to discard. Such methods do not utilize depth map information associated with each elemental image.

In "Compression for Full-Parallax Light Field Displays," Graziosi et al. propose criteria to sub-sample elemental images based on simple pinhole camera coverage geometry to reduce light field redundancy. The downsampling technique taught by Graziosi et al. is simpler than the complicated basis decompositions often employed in other CODEC schemes for two dimensional image and video data. Where an object is located deep within a scene, the light field is sampled at a smaller rate. For example, when two separate pinhole cameras provide two different fields of view, there is very little difference from one elemental image to the next elemental image, and the fields of view from the two pinhole cameras overlap. While the views are subsampled based on geometric (triangle) overlap, the pixels within the views are not compressed. Because these pixels can be substantial, Graziosi et al. compress the pixels with standard two-dimensional image compression techniques.

Graziosi et al. teach that the sampling gap (ΔEI) between elemental images, based on the minimum depth of an object d, can be calculated as follows, where θ represents the light field display's field of view and P represents the lens pitch of the integral imaging display:

$$\Delta EI = \frac{(2d)\tan(\theta/2)}{P}$$

This strategy provides a theoretically lossless compression for fronto-parallel planar surfaces when there are no image occlusions. As shown in the formula, the sampling gap increases with d, providing an improved compression rate when fewer elemental images are required. For sufficiently small d, ΔEI can reach 0. Therefore, this downsampling technique gives no guaranteed compression rate. In a scene with multiple small objects, where the objects are close to the screen or are at the screen distance, each elemental image would have at least some pixels at a 0 depth and this technique would provide no gains, i.e. ΔEI=0 throughout the integral image.

Graziosi et al. equate the rendering process with the initial encoding process. Instead of producing all of the elemental images, this method only produces the number needed to reconstruct the light field while minimizing any loss of information. Depth maps are included with the elemental images selected for encoding and the missing elemental images are reconstructed using well-established warping techniques associated with depth image-based rendering (DIBR). The selected elemental images are further compressed using methods similar to the H.264/AVC method, and the images are decompressed prior to the final DIBR-based decoding phase. While this method provides improved compression rates with reasonable signal distortion levels, no time-based performance results are presented. Such encoding and decoding cannot provide good low-latency performance for high bandwidth rates. In addition, this method is limited to use for a single object that is far away from the display screen; in scenes with multiple overlapping objects and many objects close to the display screen, the compression would be forced back to use H.264/AVC style encoding.

Chai teaches plenoptic sampling theory to determine the amount of angular bandwidth required to represent fronto-parallel planar objects at a particular scene depth. Zwicker et al. teach that the depth of field of a display is based on the angular resolution, with more resolution providing a greater depth of field. Therefore, objects close to the display screen are represented adequately with lower angular resolution, while far objects require larger angular resolutions. Zwicker et al. teach the maximum display depth of field with ideal projective lenses based on planar parameterization is:

$$Z_{DOF} = \frac{fP_l}{P_p}$$

where $P_l$ is the lens pitch and $P_p$ is the pixel pitch and f is the focal length of the lenses. In a three dimensional display with an isotropic angular resolution (i.e. $N=N_u=N_v$), $N=P_l/P_p$. Therefore, $Z_{DOF}=fN$.

To determine the angular resolution required to represent the full spatial resolution of the display, at a given depth d, the equation is rearranged as:

$$N_{res}(d) = \frac{d}{f}$$

Therefore, each focal length distance into the scene adds another pixel of angular resolution required to fully represent objects at the given spatial resolution of the display screen.

Layered Scene Decomposition and Sampling Scheme

The sampling gap taught by Graziosi et al. and the plenoptic sampling theory taught by Zwicker et al. provide complimentary light field sampling strategies: Graziosi et al. increase downsampling for distant objects (ΔEI) while Zwicker et al. increase downsampling for near objects ($N_{res}$). However, when downsampling a single light field representing a scene, the combination of these strategies does not guarantee compression. Therefore, the present disclosure divides a multiple-dimensional scene into a plurality of layers. This division into a plurality of (data) layers is referred to herein as a layered scene decomposition. Where $K_1$ and $K_2$ are natural numbers, we define $L=(K_1, K_2, L^O, L^P)$, partitioning the inner and outer frustum volumes of a three-dimensional display. The inner frustum is partitioned into a set of $K_1$ layers, where $L^O=\{l_1^O, l_2^O \ldots l_{K_1}^O\}$. Each inner frustum layer is defined by a pair of bounding planes parallel to the display surface at distances $d_{min}(l_i^O)$ and $d_{max}(l_i^O)$ for $1 \leq i \leq K_1$ from the display surface plane. The outer frustum is partitioned into a set of $K_2$ layers, where $L^P=\{l_1^P, l_2^P \ldots l_{K_2}^P\}$. Each outer frustum layer is defined by a pair of bounding planes parallel to the display surface at distances $d_{min}(l_i^P)$ and $d_{max}(l_i^P)$ for $1 \leq i \leq K_2$ from the display surface plane. In alternate embodiments, the inner and outer frustum volumes may be divided by layering schemes differing from each other.

Each of the layered scene decomposition layers has an associated light field (herein also referred to as a "light field layer") based on the scene restrictions to the planar bounding regions of the layer. Consider a layered scene decomposition $L=(K_1, K_2, L^O, L^P)$ for a light field display $D=(M_x, M_y, N_u, N_v, f, a, D_{LP})$ with an inner frustum layer $l_j^P \in L^P$ for $1 \leq i \leq K_1$, or an outer frustum layer $l_j^O \in L^O$ for $1 \leq j \leq K_2$. The inner frustum light field $LF_{l_i^O}$ is generated from the set of generalized pinhole cameras $O=\{C_a(x, y) | 1 \leq x \leq M_x, 1 \leq y \leq M_y\}$. This equation is constrained such that only the space at distance d from the light field display surface, where $d_{min}(l_i^P) \leq d \leq d_{max}(l_i^P)$ is imaged. Therefore, for an inner frustum layer with a fixed x, y and $C_a(x, y) \in O$, we calculate $LF_{l_i^O}(x, y, u, v) = I_{C_a(x,y)}$. Similarly, the outer frustum light field $LF_{l_i^P}$ is generated from the set of generalized pinhole cameras $P=\{C_a^*(x,y) | 1 \leq x \leq M_x, 1 \leq y \leq M_y\}$. This equation is constrained such that only the space at distance d from the light field display surface, where $d_{min}(l_i^P) \leq d \leq d_{max}(l_i^P)$, is imaged. Therefore, for an outer frustum layer with a fixed x, y and $C_a(x, y) \in P$, we calculate $LF_{l_i^P} = I_{C_a(x,y)}$.

The sets of light fields for the inner and outer frustum regions relative to the layered scene decomposition L can be further defined. Assume a light field display $D=(M_x, M_y, N_u, N_v, f, a, D_{LP})$ with a layered scene decomposition $L=(K_1, K_2, L^O, L^P)$. The set of inner frustum region light fields is defined as $O^{LF}=\{LF_{l_i^O} | 1 \leq i \leq K_1\}$. The set of outer frustum region light fields is defined as $P^{LF}=\{LF_{l_i^P} | 1 \leq i \leq K_2\}$.

As defined, a layered scene decomposition generates a light field for each layer. For any layered scene decomposition, orthoscopic cameras generate inner frustum volume light fields and pseudoscopic cameras generate outer frustum volume light fields. If a scene captured by these generalized pinhole camera pairs is comprised of only opaque surfaces, each point of the light field has an associated depth value which indicates the distance from the generalized pinhole camera plane to the corresponding point in space imaged. When given a light field $LF_{l_i^O} \in O^{LF}$ or $LF_{l_i^P} \in P^{LF}$, the $LF_{l_i^O}$ depth map is formally defined as $D_m[LF_{l_i^O}](x, y, u, v)$, and the $LF_{l_i^P}$ depth map is formally defined as $D_m[LF_{l_i^P}](x, y, u, v)$. The depth maps $D_m=\infty$ where there are no surface intersection points corresponding to the associated imaging generalized pinhole camera rays. Across their domains, $d_{min}(l_i^P) \leq D_m[LF_{l_i^P}](x, y, u, v) \leq d_{max}(l_i^P)$ and $d_{min}(l_i^O) \leq D_m[LF_{l_i^O}](x, y, u, v) \leq d_{max}(l_i^O)$. In other words, depth maps associated with a layered scene decomposition layer's light field are bound by the depth bounds of the layer itself.

A merging operation can re-combine the layered scene decomposition layer sets back into the inner and outer frustum volumes, or $LF_O$ and $LF_P$. The inner and outer frustum volume light fields are merged with the merging operator $*_m$. For example, when given two arbitrary light fields, $LF_1(x, y, u, v)$ and $LF_2(x, y, u, v)$, where $i=\mathrm{argmin}_{j \in \{1,2\}} D_m[LF_j](x, y, u, i)$, $*_m$ is defined as:

$$LF_1(x,y,u,v) *_m LF_2(x,y,u,v) = LF_i(x,y,u,v)$$

Therefore, $LF_O(x, y, u, v)$ and $LF_P(x, y, u, v)$ can be recovered from the sets $O^{LF}$ and $P^{LF}$ by merging the light fields associated with the inner and outer frustum layers. For example:

$$LF_O = LF_{l_1^O} *_m LF_{l_2^O} *_m \ldots *_m LF_{l_{K_1}^O}$$

$$LF_P = LF_{l_1^P} *_m LF_{l_2^P} *_m \ldots *_m LF_{l_{K_1}^P}$$

The present disclosure provides a layered scene decomposition operation and an inverse operation which merges the data to reverse said decomposition. Performing a layered scene decomposition with K layers is understood to create K times as many individual light fields. The value of the layered scene decomposition is in the light fields induced by the layers; these light field layers are more suitable for downsampling than the original total light field or the inner frustum volume or outer frustum volume light fields, as the total data size required for multiple downsampled layered scene decomposition light field layers with an appropriate sampling scheme is significantly less than the size of the original light field.

The skilled technician in the field to which the invention pertains will appreciate that there are multiple types of sampling schemes that can successfully sample a light field. The sampling scheme S provided is not intended to limit or depart from the scope and spirit of the invention, as other sampling schemes, such as specifying individual sampling rates for each elemental image in the layered scene decomposition layer light fields, can be employed. Relatively simple sampling schemes can provide an effective CODEC with greater sampling control, therefore the present disclosure provides a simple sampling scheme to illustrate the disclosure without limiting or departing from the scope and spirit of the invention.

A light field sampling scheme provided according to the present disclosure represents a light field encoding method. Given a display $D=(M_x, M_y, N_u, N_v, f, a, D_{LP})$ and a layered scene decomposition $L=(K_1, K_2, L^O, L^P)$, the present disclosure provides a sampling scheme S associated with L as an $M_x \times M_y$ binary matrix $M_S[l_i]$ associated with any layer $l_i$ in $L^O$ or $L^P$ and a mapping function $R(l_i)$ to map each layer $l_i$ to a pair $R(l_i)=(n_x, n_y)$. A binary (\{0,1\}) entry in $M_S[l_i]$ at $(x_m, y_m)$ indicates if the elemental image $LF_{l_i}(x_m, y_m, u, v)$ is included in the sampling scheme: a (1) indicates $LF_{l_i}(x_m, y_m, u, v)$ is included, and a (0) indicates $LF_{l_i}(x_m, y_m, u, v)$ is not included. $R(l_i)=(n_x, n_y)$ indicates the elemental images in light field $LF_{l_i}$ are sampled at a resolution of $n_x \times n_y$.

The present disclosure also provides a layered scene decomposition light field encoding process that draws upon plenoptic sampling theory. The following description pertains to the inner frustum volume $L^O$ of a layered scene decomposition L, but the outer frustum volume $L^P$ may be encoded in a similar fashion.

For each $l_i \in L^O$, the depth map of the corresponding light field $LF_{l_i}$ is restricted to d in the range $d_{min}(l_i^O) \leq d \leq d_{max}(l_i^O)$. Based on the sampling scheme presented above, the present disclosure creates a sampling scheme S using the following equation to guide the creation of $M_S[l_i^O]$:

$$\Delta EI(d_{min}(l_i^O)) = \frac{(2d_{min}(l_i^O))\tan(\theta/2)}{D_{LP}}$$

In other words, $\Delta EI$ guides the distance between "1" entries in the $M_S$ matrix associated with each layered scene decomposition layer. The following equation sets the resolution of the individual elemental images $$R(l_i^O) = \frac{d_{max}(l_i^O)}{f}, \frac{d_{max}(l_i^O)}{f}$$

in a layer:

$$N_{res}(d_{max}(l_i^O)) = \frac{d_{max}(l_i^O)}{f}$$

This sampling scheme, using both $\Delta EI$ and $N_{res}$ to drive individual layered scene decomposition layer sampling rates, can be considered as a layered plenoptic sampling theory sampling scheme (otherwise referred to herein as "plenoptic sampling scheme"). This plenoptic sampling scheme is based on a display utilizing the plenoptic sampling theory identity function $\alpha(t)=t$. This per-layer sampling scheme provides lossless compression for fronto-parallel planar scene objects where the objects within a layer do not occlude each other.

The assumption of only fronto-parallel planar scene objects is restrictive and does not represent typical scenes; inevitably there are intra-layer occlusions, especially for layered scene decomposition layers that are larger in size. To capture and encode a full range of potential scenes without introducing significant perceivable artifacts, the system can draw upon information in addition to the light field plenoptic sampling scheme of the present disclosure.

For example, surfaces are locally approximated by planar surfaces at various slanting angles. In "On the bandwidth of the plenoptic function," Do et al., theorize time-warping techniques allowing for the spectral characterization of slanted light field display planes. This work suggests that a necessary decrease in downsampling and the need for precise characterization of local bandwidth changes is induced by the degree of surface slanting, the depth of objects in the scene, and the positioning of objects at the FOV edge. Therefore, if signal distortions from fronto-parallel geometry deviations are perceptually significant, residue representations can adaptively send additional or supplemental elemental image data (dynamically altering the static sampling scheme) to compensate for losses incurred.

The present disclosure therefore provides for the identification as "core" or "residue" information for the encoding and decoding of the light field by the CODEC. When given a light field display D and a corresponding layered scene decomposition L with an associated sampling scheme S, the present disclosure considers the encoded, downsampled light fields associated with L and S, as well as the number of layered scene decomposition layers and the depth of said layers, as the "core" representation of a light field encoded and decoded by the CODEC. Any additional information transmitted along with the core (encoded) representation of the light field that may be required during the decoding process is considered as the "residue" representation of the light field to be processed by the CODEC and used together with the core representation of the light field to produce the final light field displayed.

Layer-Based Compression Analysis

Predictable compression rates are required to create a real-time rendering and transmission system, together with downsampling criteria (which do not indicate achievable compression rates). The following provides a compression analysis of the present disclosure's layered scene decomposition encoding strategy.

As already described, downsampling a light field based on plenoptic sampling theory alone does not offer guaranteed compression rates. The present disclosure provides a downsampling light field encoding strategy, allowing for a low-latency, real-time light field CODEC. In one embodiment, complementary sampling schemes based on plenoptic sampling theory, using both $\Delta EI$ and $N_{res}$ are employed to drive individual layered scene decomposition layer sampling rates. The layered scene decomposition, representing the total 3D scene as a plurality of light fields, expands the scene representation by a factor of the number of layers. The present disclosure further contemplates that when layer depths are chosen appropriately, compression rates can be guaranteed when combined with plenoptic sampling theory based downsampling.

For a light field $LF_{l_i}$ corresponding to a given layered scene decomposition layer $l_i$, the layer's restricted depth range provides a guaranteed compression rate for the layer's light field. The achievable compression ratio from downsampling a scene completely contained within a single layer can be explained in the following theorem:

Theorem 1

Consider a display $D=(M_x, M_y, N_u, N_v, f, a, D_{LP})$ with an isotropic angular resolution $N=N_u=N_v$, a layered scene decomposition L and an associated sampling scheme $S=(M_s, R)$. Assume a layered scene decomposition layer $l_i$ with the corresponding light field $LF_{l_i}$ such that $d_{min}(l_i) \leq Z_{DOF}(D)$, and $M_s[LF_{l_i}]$ is selected so the distance between "1" entries is set to $\Delta EI(d_{min}(l_i))$ and $R(l_i)=N_{res}(d_{max}(l_i))$. The compression ratio associated with S relative to the layered scene decomposition layer $l_i$ is 1:

$$N^2 \left( \frac{d_{min}(l_i)}{d_{min}(l_i)} \right).$$

Proof 1

Consider a layered scene decomposition layer within the maximum depth of field of the display, where $$d_{min}(l_i) = \frac{Z_{DOF}}{c} \text{ and } d_{max}(l_i) = \frac{Z_{DOF}}{d} \text{ for } 0 < c, d \leq Z_{DOF}.$$

Therefore, $$c = \frac{Z_{DOF}}{d_{min}(l_i)} \text{ and } d = \frac{Z_{DOF}}{d_{max}(l_i)} \text{ and } d/c = \frac{d_{min}(l_i)}{d_{max}(l_i)}.$$

Therefore $\Delta EI(d_{min}(l_i))=N/c$ and $N_{res}(d_{max}(l_i))=N/d$. Based on this rate of sub-sampling, the system requires every $(N/c)^{th}$ elemental image, therefore providing a compression ratio of $1:(N/c)^2$. The elemental image sub-sampling provides a $1:d^2$ compression ratio. Therefore the total compression ratio is $1:(N/c)^2 * 1:d^2 = 1:N^2 (d/c)^2$. The compression factor term $$c_f = \frac{d_{min}(l_i)}{d_{min}(l_i)}$$

determines the compression ratio.

There may be an alternate case where $d_{min}(l_i)=Z_{DOF}$ and $(d_{max}(l_i))$ can extend to any arbitrary depth. We know $\Delta EI(Z_{DOF})=N$ and $N_{res}$ attains the maximum possible value of N for all depths $d \geq Z_{DOF}$. Based on this rate of sub-sampling, the system requires every $N^{th}$ elemental image, thus providing the light field with a $1:N^2$ compression ratio. Adding additional layered scene decomposition layers beyond $Z_{DOF}$ adds redundant representational capability when representing fronto-parallel planar objects. Therefore, when creating a core encoded representation, the total scene may be optimally decomposed with the maximum depth of field in the layers.

Given the compression calculation expression for downsampling a layered scene decomposition layer, we can determine how the compression factor varies as the layer parameters vary. For a layer of a fixed width, or $d_{max}(l_i)-d_{min}(l_i)=w$ for some w, the $c_f$ term is minimized when $d_{max}(l_i)-d_{min}(l_i)$ is closest to the display plane. Therefore, layered scene decomposition layers located closer to the display plane require a narrower width to achieve the same compression ratio as layers located further away from the display plane. This compression rate analysis can extend to scenes that are partitioned into multiple adjacent fronto-planar layers located in the space from the display plane until the depth $Z_{DOF}$.

Theorem 2

Consider a display $D=(M_x, M_y, N_u, N_v, f, a, D_{LP})$ with an isotropic angular resolution $N=N_u=N_v$, a layered scene decomposition L and an associated sampling scheme $S=(M_s, R)$. Let $S_{LF}=M_xM_yN_uN_v$, denoting the number of image pixels in the light field. The compression ratio of the layered scene decomposition representation can be defined as:

$$\frac{A}{S_{LF}} = (1/N^2) \sum_{k=1}^{K} \sum_{k=1}^{K} (1/c_f(i)^2) = (1/N^2) \sum_{k=1}^{K} \left( \frac{d_{max}(l_i)}{d_{min}(l_i)} \right)^2$$

Proof 2

For a given layered scene decomposition layer downsampled with compression ratio:

$$S_{layer}(i) = \left( \frac{1}{N^2 c_f(i)^2} \right) S_{LF}$$

To calculate the compression ratio, the size of each layer in the compressed form is computed and summed, and the total compressed layer size is divided by the size of the light field. Consider a sum where the size of the compressed set of layers is:

$$A = \sum_{k=1}^{K} \left( \frac{1}{N^2 c_f(i)^2} \right) S_{LF}$$

Therefore the compression ratio of the combined layers is:

$$\frac{A}{S_{LF}} = (1/N^2) \sum_{i=1}^{K} (1/c_f(i)^2) = (1/N^2) \sum_{i=1}^{K} \left( \frac{f + i\Delta L}{f + (i-1)\Delta L} \right)^2$$

In a system where the layered scene decomposition layers are of variable width, with $d_{min}(i)$ and $d_{max}(i)$ representing the front and back boundary depths of the $i^{th}$ layer, the compression ratio of the layered scene decomposition representation is:

$$\frac{A}{S_{LF}} = (1/N^2)\sum_{i=1}^{K}(1/c_f(i)^2) = (1/N^2)\sum_{i=1}^{K}\left(\frac{d_{max}(i)}{d_{min}(i)}\right)^2$$

The sum $\Sigma_{i=1}^{K}$ $(1/c_f(i)^2)$ for constant layered scene decomposition layers is monotonically decreasing and tending towards 1.

Therefore, layered scene decomposition layers located closer to the display plane achieve a lower compression ratio than layers of the same width located further away from the display plane. To maximize efficiency, layered scene decomposition layers with a more narrow width are located closer to the display plane, and wider layered scene decomposition layers are located further away from the display plane; this placement maintains a uniform compression rate across the scene.

Number and Size of Layered Scene Decomposition Layers

To determine the number of layers and the size of layers required for the layered scene decomposition, a light field display with an $\alpha(t)=t$ identity function, is provided as an example. The consideration of this identity function is not intended to limit the scope or spirit of the present disclosure, as other functions can be utilized. The skilled technician in the field to which the invention pertains will appreciate that while the display $D=(M_x, M_y, N_u, f, a, D_{LP})$ is defined with a single identity function $\alpha$, each light field planar-parameterized pinhole projector within an array of planar-parameterized pinhole projectors may have a unique identity function $\alpha$.

To losslessly represent fronto-planar surfaces (assuming no occlusions), a single layered scene decomposition layer with a front boundary located at depth $Z_{DOF}$ represents the system from $Z_{DOF}$ to infinity. To generate a core representation, layered scene decomposition layers beyond the deepest layer located at the light field display's maximum depth of field are not considered, as these layers do not provide additional representative power from the core representation perspective; this applies to both the inner and outer frustum volume layer sets.

Within the region from the display plane to the maximum depth of field of the display (for both the inner and outer frustum volume layer sets), the layered scene decomposition layers utilize maximum and minimum distance depths that are integer multiples of the light field display f value. Layered scene decomposition layers with a more narrow width provide a better per-layer compression ratios, thereby providing better overall scene compression ratios. However, a greater number of layers in the decomposition increases the amount of processing required for decoding, as a greater number of layers must be reconstructed and merged. The present disclosure accordingly teaches a layer distribution scheme with differential layer depths. In one embodiment, layered scene decomposition layers (and by correlation the light fields represented by said layers) with a more narrow width are located closer to the display plane, and the layer width (i.e., the depth difference between the front and back layer boundaries) increases exponentially as the distance from the display plane increases.

Disparity Encoding/Decoding

The encoded layered scene decomposition representation of a light field produced from a sampling scheme applied to each layer is principally comprised of a plurality of pixels including RGB color and disparity. Generally speaking, selecting an appropriate bit width for the disparity (depth) field of the pixel is important, as the width of this field improves the accuracy of the operation during reconstruction. However, the use of an increased number of bits contributes negatively to the compression rate achieved.

In the present disclosure, each layer of RGB color and disparity pixels specified by the given sampling scheme has a specific range of disparity corresponding to the individual pixels. The present disclosure exploits this narrow range of disparity within each layered scene decomposition layer to increase the accuracy of the depth information. In conventional pixel representations, the range of disparity for an entire scene is mapped to a fixed number of values. For example, in 10-bit disparity encoding, there can only be 1024 distinct depth values. In the layered scene decomposition of the present disclosure, the same fixed number of values are applied to each layered scene decomposition layer, as each layer has known depth boundaries. This is advantageous as the transmission bandwidth can be reduced by decreasing the width of the depth channel, while maintaining pixel reconstruction accuracy. For example, when the system implements a disparity width of 8-bits and the scene is decomposed into 8 layered scene decomposition layers, a total of 2048 distinct disparity values can be used, with each layer having 256 distinct possible values based on 8-bit representation. This is more efficient than mapping the entire range of possible disparity values within the inner or outer frustum to a given number of bits.

The present disclosure utilizes the same number of bits, but the bits are interpreted and distinctly represent disparity within each layered scene decomposition layer. Since each layered scene decomposition layer is independent from each other, depth (bit) encoding can differ for each layer and can be designed to provide a more accurate fixed point representation. For example, a layered scene decomposition layer closer to the display screen has smaller depth values and can use a fixed point format with a small number of integer bits and a large number of fractional bits, while layered scene decomposition layers further away from the display screen has larger depth values and can use a fixed point format with a large number of integer bits and a small number of fractional bits.

The fractional bits are configurable on a per layer basis:

MinFixedPoint=1/($2^{FractionalBits}$)

MaxFixedPoint=$2^{16-FractionalBits}$−MinFixedPoint

Disparity is calculated from the depth in the light field post-processing stage and encoded using the following formula:

ScaleFactor=(MaxFixedPoint−MinFixedPoint)/(NearClipDisparity−FarClipDisparity)

EncodedDisparity=(Disparity−FarClipDisparity)*ScaleFactor+MinFixedPoint

Disparity is decoded using the following formula:

ScaleFactor=(MaxFixedPoint−MinFixedPoint)/(NearClipDisparity−FarClipDisparity)

UnencodedDisparity=(EncodedDisparity−MinFixedPoint)/ScaleFactor+FarClipDisparity

Generalized and Illustrative Embodiment—CODEC Implementation and Applications

Overview

The present disclosure defines an encoder-decoder for various types of angular pixel parameterizations, such as, but not limited to, planar parameterizations, arbitrary display parameterizations, a combination of parameterizations, or any other configuration or parameterization type. A generalized and illustrative embodiment of the present disclosure provides a method to generate a synthetic light field for multi-dimensional video streaming, multi-dimensional interactive gaming, or other light-field display scenarios. A rendering system and processes are provided that can drive a light-field display with real-time interactive content. The light-field display does not require long-term storage of light fields, however, the light fields must be rendered and transmitted at low latency to support an interactive user experience.

Figure 7:
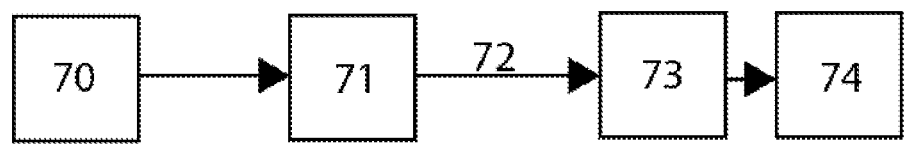
FIG. 7: illustrates schematically an exemplary CODEC system embodiment according to the present disclosure.

FIG. 7 provides a CODEC system overview of the generalized, illustrative embodiment of the present invention. A gaming engine or interactive graphics computer (70) transmits three-dimensional scene data to GPU (71). The GPU encodes the data and sends it over the display port (72) to a decoding unit (73) containing a decoding processor such as an FPGA or ASIC. The decoding unit (73) sends decoded data to a light-field display (74).

FIG. 1 illustrates another generalized, exemplary layered scene decomposition CODEC system, where light field data from a synthetic or video data source (50) is input to encoder (51). A GPU (43) encodes the inner frustum volume data, dividing it into a plurality of layers, and GPU (53) encodes the outer frustum volume data, dividing it into an additional plurality of layers. While FIG. 1 illustrates separate GPUs (43, 53) dedicated for the inner and outer frustum volume layers, a single GPU can be utilized to process both the inner and outer frustum volume layers. Each of the layered scene decomposition layers are transmitted to decoder (52), where the plurality of inner frustum volume layers (44(1) through 44(*)) and the plurality of outer frustum volume layers (54(1) through 54(*)) of a light field are decoded and merged into a single inner frustum volume layer (45) and a single outer frustum volume layer (55). As per double frustum rendering, the inner and outer frustum volumes are then synthesized (merged) into a single, reconstructed set of light field data (56), otherwise referred to herein as a "final light field" or "display light field".

FIGS. 10 to 13 illustrate exemplary CODEC process implementations according to the present disclosure.

Figure 10:
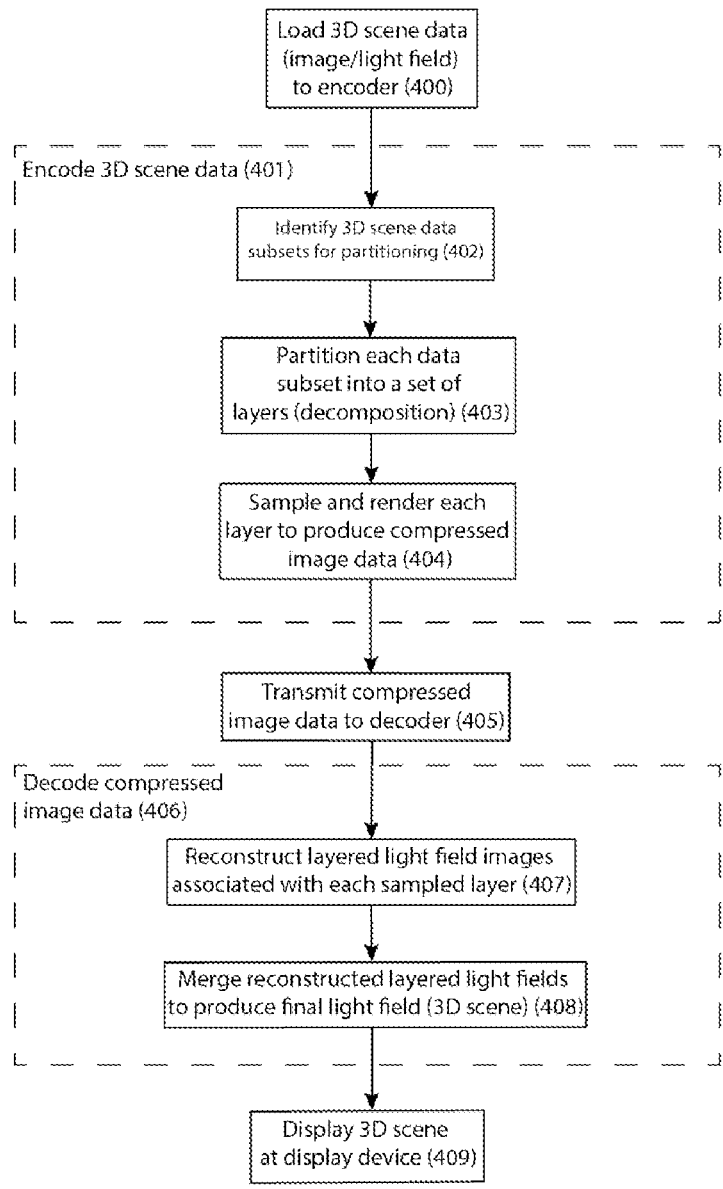
FIG. 10: illustrates an exemplary CODEC process flow according to the present disclosure.

FIG. 10 illustrates an exemplary layered scene decomposition CODEC method, whereby 3D scene data in the format of image description or light field data is loaded to an encoder (400) for encoding, whereupon data (sub)sets as illustrated in the figure, or alternatively the entire data set representing the 3D scene is partitioned (403). In the case of the identification of 3D scene data subsets for partitioning (402), it is understood that the identification process is a general process step reference which is intended to simply refer to the ability to partition the data set in one pass, or in groupings (e.g. to encode inner frustum and outer frustum data layers as illustrated in more detail in FIG. 11), as may be desired according to the circumstances. In this regard, the identification of data subsets may imply pre-encoding processing steps or processing steps also forming part of the encoding sub-process stage (401). Data subsets may be tagged, specified, confirmed, scanned and even compiled or grouped at the time of partitioning to produce a set of layers (decomposition of the 3D scene) (403). Following the partitioning of data subsets (403), each data layer is sampled and rendered according the present disclosure to produce compressed (image) data (404). Following data layer compression the compressed data is transmitted to a decoder (405) for the decoding sub-process (406) comprising decompression, decoding and re-composition steps to (re)construct a set of light fields (407), otherwise referred to herein as "layered light fields", layered light field images and light field layers. The constructed layered light fields are merged to produce the final light field (408) displaying the 3D scene (409).

Figure 13:
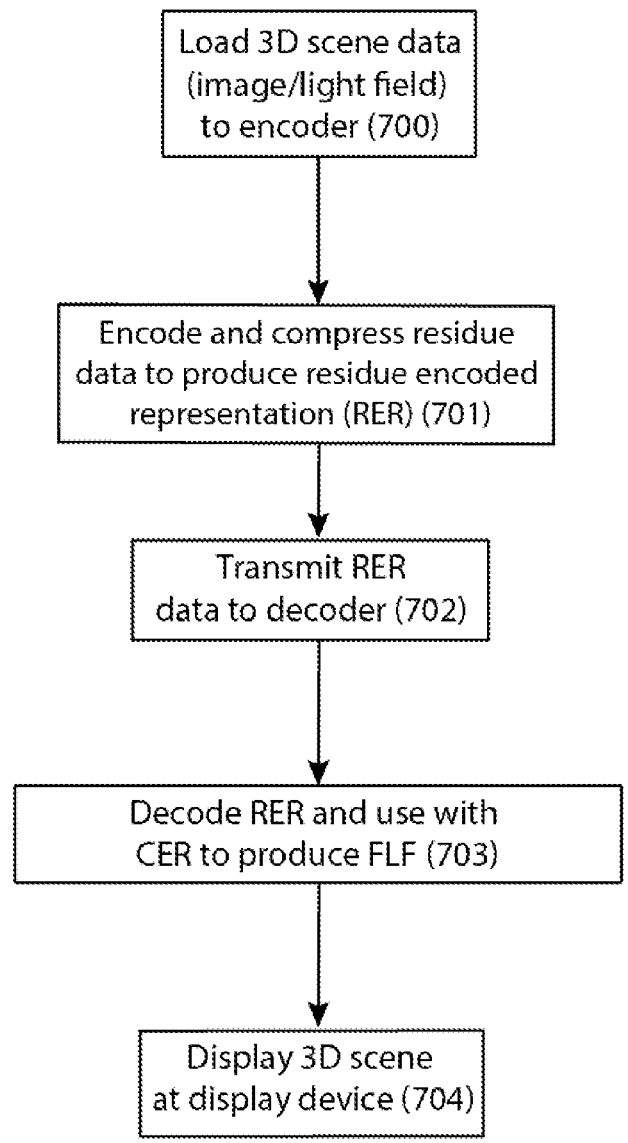
FIG. 13: illustrates an exemplary process flow for encoding and decoding residue image data for use with core image data to produce a (display/final) light field at a display according to the present disclosure.

An exemplary, parallel CODEC process is illustrated in FIG. 13 for optimizing the delivery of a light field representing a 3D scene in real-time (e.g. to minimize artifacts). The process comprises the steps of loading 3D scene data to an encoder (700), encoding and compressing the residue encoded representation (701) of the final light field, transmitting the residue encoded representation (702) to a decoder, decoding the residue encoded representation and using the residue encoded representation with the core encoded representation to produce the final light field (703) and display the 3D scene at a display (704).

Figure 11:
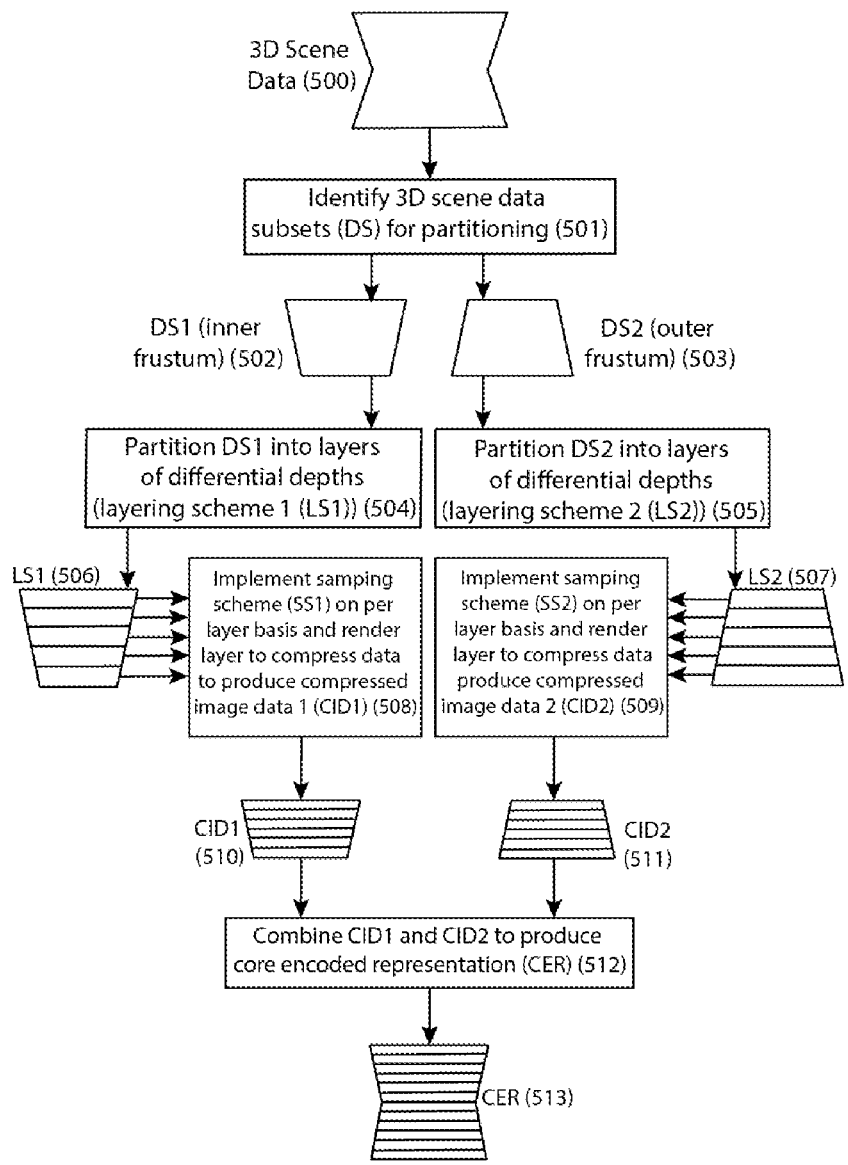
FIG. 11: illustrates an exemplary process flow for encoding 3D image (scene) data to produce layered and compressed core encoded (light field) representations, according to the present disclosure.

FIG. 11 illustrates an embodiment related to the embodiment shown in FIG. 10 in that two data (sub)sets (502, 503) derived based on the 3D scene data (500) are identified for partitioning (501) and the partitioning of each data set into layers of differential depths is implemented according to two different layering schemes for each data set (504, 505), i.e. equivalent to a plurality of data layers. Each set (plurality) of data layers (506, 507) representing an inner frustum and outer frustum volume of a light field display respectively are subsequently sampled on a per layer basis according to sampling scheme (508, 509); and each sampled layer is rendered to compress the data and produce two sets of compressed (image) data (510, 511) in process steps (508, 509), respectively. The sets of compressed data (510, 511) encoding the sets of light fields corresponding to the sets of data layers (506, 507), are then combined (512) to produce a layered, core encoded representation (513) of a final (display) light field.

Figure 12:
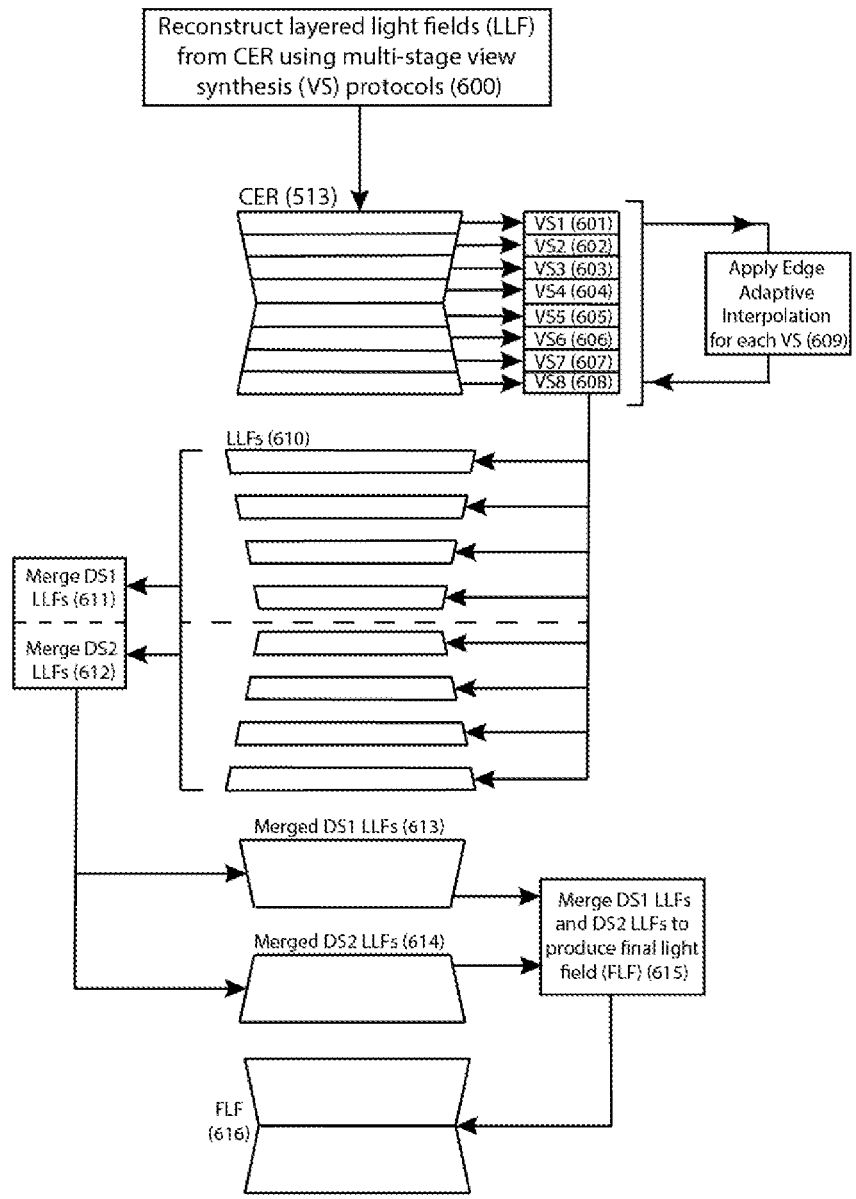
FIG. 12: illustrates an exemplary process flow for decoding core encoded representations to construct a (display) light field at a display, according to the present disclosure.

FIG. 12 illustrates an embodiment of a CODEC method or process to reconstruct a set of light fields and produce a final light field at a display. The set of light fields (layered light fields) is (re)constructed from the core encoded representation (513) using multi-stage view synthesis protocols (600). A protocol (designated as VS1-VS8) is applied (601-608) to each of the eight layers of the core encoded representation (513), which protocols may or may not be different depending on characteristics of each data layer light field to be decoded. Each protocol may apply a form of non-linear interpolation termed herein as edge adaptive interpolation (609) to provide good image resolution and sharpness in the set(s) of layered light fields (610) reconstructed from the core encoded representation of said fields ensure image sharpness. The layered light fields (610) are merged, in this case illustrating the merging of two sets of light fields (611, 612) corresponding to two data subsets to produce two sets of merged light fields (613, 614). The merged sets of light fields (613, 614) may represent, for example, the inner frustum and outer frustum volumes of a final light field and can be accordingly merged (615) to produce said final light field (616) at a display.

CODEC Encoder/Encoding

Encoding according to the present disclosure is designed to support the generation of real-time interactive content (for example, for gaming or simulation environments) as well as existing multi-dimensional datasets captured through light field generalized pinhole cameras or camera arrays.

For a light field display D, a layered scene decomposition L, and a sampling scheme S, the system encoder produces the elemental images associated with the light fields corresponding to each layered scene decomposition layer included in the sampling scheme. Each elemental image corresponds to a generalized pinhole camera. The elemental images are sampled at the resolution specified by the sampling scheme and each elemental image includes a depth map.

Achieving rendering performance to drive real-time interactive content to multi-dimensional display with a significantly high resolution and size presented significant challenges overcome with the application of a hybrid or combination rendering approach to resolve the deficiencies of relying solely on any one technique as described herein.

When given identity function α, the set of generalized pinhole cameras specified by the encoding scheme for a given layered scene decomposition layer can be systematically rendered using standard graphics viewport rendering. This rendering method results in a high number of draw calls, particularly for layered scene decomposition layers with sampling schemes including large numbers of the underlying elemental images. Therefore, in a system utilizing layered scene decomposition for realistic, autostereoscopic light field displays, this rendering method alone does not provide real-time performance.

A rendering technique utilizing standard graphics draw calls restricts the rendering of a generalized pinhole camera's planar parameterizations (identity function α) to perspective transformations. Hardware-optimized rasterization functions provide the performance required for high-quality real-time rendering in traditional two-dimensional displays. These accelerated hardware functions are based on planar parameterizations. Alternatively, parallel oblique projections can utilize standard rasterized graphics pipelines to render generalized pinhole camera planar parameterizations.

The present disclosure contemplates the application of rasterization to render the generalized pinhole camera views by converting sets of triangles into pixels on the display screen. When rendering large numbers of views, every triangle must be rasterized in every view; oblique rendering reduces the number of rendering passes required for each layered scene decomposition layer and can accommodate any arbitrary identity function α. The system utilizes one parallel oblique projection per angle specified by the identity function α. Once the data is rendered, the system executes a "slice and dice" block transform (see U.S. Pat. Nos. 6,549,308 and 7,436,537) to re-group the stored data from its by-angle grouping into an elemental image grouping. The "slice and dice" method alone is inefficient for real-time interactive content requiring many separate oblique rendering draw calls when a large number of angles are to be rendered.

An arbitrary identity function α can also be accommodated by a ray-tracing rendering system. In ray tracing, specifying arbitrary angles does not require higher performance than accepting planar parameterizations. However, for real-time interactive content requiring rendering systems utilizing the latest accelerated GPUs, rasterization provides more reliable performance scalability than ray tracing rendering systems.

The present disclosure provides several hybrid rendering approaches to efficiently encode a light field. In one embodiment, encoding schemes render layered scene decomposition layers located closer to the display plane, with more images requiring less angular samples, and layers located further away from the display plane, with less images and more angular samples. In a related embodiment, perspective rendering, oblique rendering, and ray tracing are combined to render layered scene decomposition layers; these rendering techniques can be implemented in a variety of interleaved rendering methods.

According to the generalized, illustrative embodiment of the disclosure, one or more light fields are encoded by a GPU rendering an array of two-dimensional pinhole cameras. The rendered representation is created by computing the pixels from the sampling scheme applied to each of the layered scene decomposition layers. A pixel shader performs the encoding algorithm. Typical GPUs are optimized to produce a maximum of 2 to 4 pinhole camera views per scene in one transmission frame. The present disclosure requires rendering hundreds or thousands of pinhole camera views simultaneously, thus multiple rendering techniques are employed to render data more efficiently.

In one optimized approach, the generalized pinhole cameras in the layered scene decomposition layers located further away from the display plane are rendered using standard graphics pipeline viewport operations, known as perspective rendering. The generalized pinhole cameras in the layered scene decomposition layers located closer to the display plane are rendered using the "slice and dice" block transform. Combining these methods provides high efficiency rendering for layered plenoptic sampling theory sampling schemes. The present disclosure provides layered scene decomposition layers wherein layers located further away from the display plane contain a smaller number of elemental images with a higher resolution and layers located closer to the display plane contain a greater number of elemental images with a lower resolution. Rendering the smaller number of elemental images in the layers further away from the display plane with perspective rendering is efficient, as the method requires only a single draw call for each elemental image. However, at some point, perspective rendering becomes or is inefficient for layers located closer to the display plane, as these layers contain a greater number of elemental images, requiring an increased number of draw calls. Since elemental images located in layers located closer to the display plane correspond to a relatively small number of angles, oblique rendering can efficiently render these elemental images with a reduced number of draw calls. In one embodiment a process to determine where the system should utilize perspective rendering, oblique rendering, or ray tracing to render the layered scene decomposition layers is provided, Applying a threshold algorithm, each layered scene decomposition layer is evaluated to compare the number of elemental images to be rendered (i.e., the number of perspective rendering draw calls) to the size of the elemental images required at the particular layer depth (i.e., the number of oblique rendering draw calls), and the system implements the rendering method (technique) requiring the least number of rendering draw calls.

Where standard graphics calls cannot be utilized, the system can implement ray tracing instead of perspective or oblique rendering. Accordingly, in another embodiment, an alternative rendering method renders layers located closer to the display plane, or a portion of the layers located closer to the display plane, using ray tracing.

In ray-tracing rendering systems, each pixel in a layered scene decomposition layer is associated with a light ray defined by the light field. Each ray is cast and the intersection with the layered scene decomposition is computed as per standard ray tracing methodologies. Ray tracing is advantageous when rendering an identity function α which does not adhere to the standard planar parameterizations expected by the standard GPU rendering pipeline, as ray tracing can accommodate the arbitrary ray angles that are challenging for traditional GPU rendering.

The skilled technician in the field to which the invention pertains will appreciate that there are multiple rendering methods and combinations of rendering methods that can successfully encode the layered scene decomposition elemental images. Other rendering methods may provide efficiency in different contexts, dependent upon the system's underlying computational architecture, the utilized sampling scheme, and the identity function α of the light field display.

CODEC Decoder/Decoding

Decoding according to the present disclosure is designed to exploit the encoding strategy (sampling and rendering). The core representation as a set of layered light fields from a downsampled layered scene decomposition is decoded to reconstruct the light fields $LF^O$ and $LF^P$. Consider a display $D=(M_x, M_y, N_u, N_v, f, a, D_{LP})$ with a layered scene decomposition $L=(K_1, K_2, L^O, L^P)$ and an associated sampling scheme $S=(M_s, R)$. The elemental images are decoded by reconstructing the light fields $LF^O$ and $LF^P$ from deconstructed $LF^O$ and $LF^P$ light fields downsampled as specified by sampling scheme S. The pixels align such that the inner and outer frustum volume layers located closer to the display plane are reviewed first, moving to inner and outer frustum volume layers located further away from the display plane until a non-empty pixel is located, and the data from the non-empty pixel is transmitted to the empty pixel closer to the display plane. In an alternative embodiment, particular implementations may restrict viewing to the inner frustum volume or the outer frustum volume of the light field display, thereby requiring the decoding of one of $LF^O$ or $LF^P$.

In one embodiment, a decoding process is represented by the following pseudocode:

Core Layered Decoding:
for each $l_i \in L^O$:
ReconLF($LF_{l_i}$, $D_m[LF_{l_i}]$, S)
$L^{FO}=LF_{l_i * m}LF_{l_{i-1}}$ // or $LF_{l_i * m}LF_{l_{i+1}}$(front-back vs. back-front)

A similar procedure reconstructs $LF^P$. Each layered scene decomposition layer is reconstructed from the limited samples defined by the given sampling scheme S. Each of the inner frustum volume layers or the outer frustum volume layers are merged to reproduce $L^{FO}$ or $LF^P$.

ReconLF can be executed in various forms with varying computational and post-CODEC image quality properties. The ReconLF input is the subset of $LF_{l_i}$ data defined by the given sampling scheme S and the corresponding downsampled depth map $D_m[LF_{l_i}]$. Depth-Image Based Rendering (DIBR), as described by Graziosi et al., can reconstruct the input light field. DIBR can be classified as a projection rendering method. In contrast to re-projection techniques, ray-casting methods, such as the screen space ray casting taught by Widmer et al., can reconstruct the light fields. Ray casting enables greater flexibility than re-projection, but increases computational resource requirements.

In the DIBR approach, elemental images specified in the sampling scheme S are used as reference "views'" to synthesize the missing elemental images from the light field. As described by Vincent Jantet in "Layered Depth Images for Multi-View Coding" and by Graziosi et al., when the system uses DIBR reconstruction, the process typically includes forward warping, merging, and back projection.

Application of the back projection technique avoids producing cracks and sampling artifacts in synthesized views such as elemental images. Back projection assumes that the elemental image's depth map or disparity map is synthesized along with the necessary reference images required to reconstruct the target image; such synthesis usually occurs through a forward warping process. With the disparity value for each pixel in the target image, the system warps the pixel to a corresponding location in a reference image; typically this reference image location is not aligned on the integer pixel grid, so a value from the neighboring pixel values must be interpolated. Implementations of backprojection known in the art use simple linear interpolation. Linear interpolation, however, can be problematic. If the warped reference image location sits on or near an object edge boundary, the interpolated value can exhibit significant artifacts, as information from across the edge boundary is included in the interpolation operation. The synthesized image is generated with a "smeared'" or blurred edge.

The present disclosure provides a back projection technique for the interpolation substep, producing a high quality synthesized image without smeared or blurred edges. The present disclosure introduces edge-adaptive interpolation (EAI), where the system incorporates depth map information to identify the pixels required by the interpolation operation to calculate the colour of the warped pixels in a reference image. EAI is a nonlinear interpolation procedure that adapts and preserves edges during low-pass filtering operations. Consider a display $D=(M_x, M_y, N_u, f, a, D_{LP})$ with a target image $l_t(x, y)$, a reference image $I_r(x,y)$, and depth maps $D_m(I_t)$ and $D_m(I_r)$. The present disclosure utilizes the depth map $D_m(I_t)$ pinhole camera parameters (f, α, etc.) and the relative position of the display's array of planar-parameterized pinhole projectors to warp each $I_t$ pixel integer (x, y,) to a real-number position $(x_w, y_w)$ in $I_r$. In the likely scenario where $(x_w, y_w)$ is not located on an integer coordinate position, a value must be reconstructed based on $I_r$ integer samples.

Linear interpolation methods known in the art reconstruct $I_r(x_w, y_w)$ from the four nearest integer coordinates located in a 2×2 pixel neighborhood. Alternate reconstruction methods use larger neighborhoods (such as 3×3 pixel neighborhoods), generating similar results with varying reconstruction quality (see Marschner et al., "An evaluation of reconstruction filters for volume rendering"). These linear interpolation methods have no knowledge of the underlying geometry of the signal. The smeared or blurred edge images occur when the reconstruction utilizes pixel neighbors belonging to different objects, separated by an edge in the images. The erroneous inclusion of colour from other objects creates ghosting artifacts. The present disclosure remedies this reconstruction issue by providing a method to weigh or omit pixel neighbors by using the depth map $D_m(I_r)$ to predict the existence of edges created when a plurality of objects overlap.

Figure 3A:
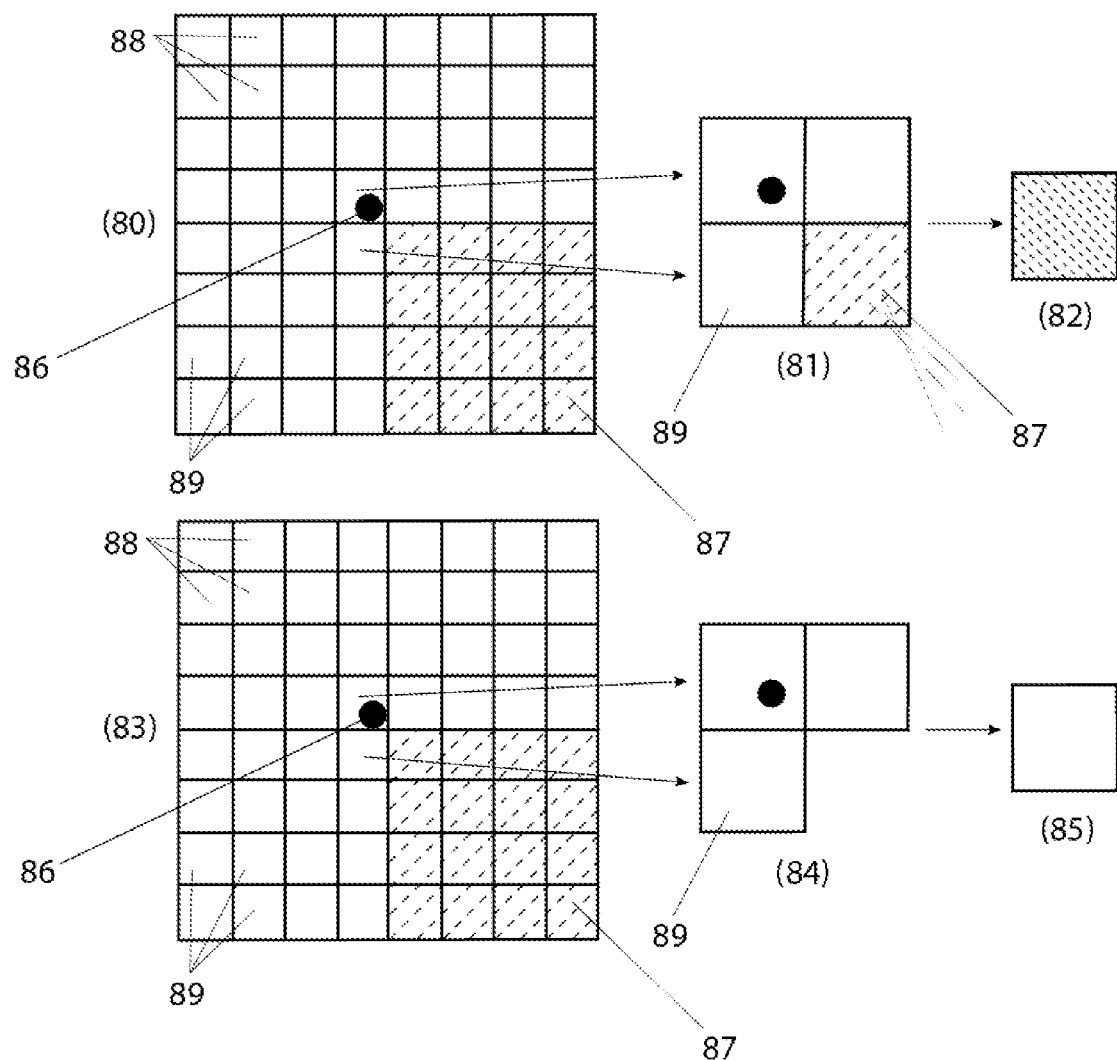
FIG. 3A: illustrates schematically the application of edge adaptive interpolation for pixel reconstruction according to the present disclosure.
Figure 3B:
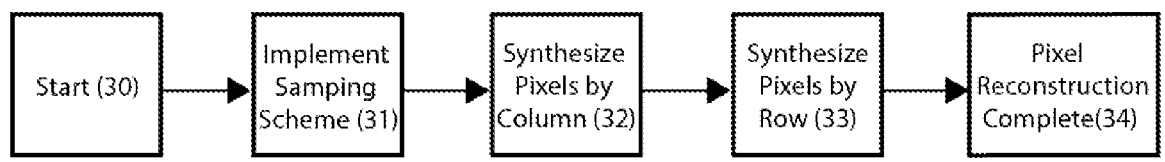
FIG. 3B: illustrates a process flow for reconstructing a pixel array.

FIG. 3 illustrates textures (80,83), where a sampling location, illustrated as a black dot, is backprojected into another image being reconstructed. The sampling location is located near the boundary of a dark object with a white background. In a first reconstruction matrix (81), the full 2×2 neighborhood reconstructs the sampling location value using a known technique such as linear interpolation. This results in a non-white pixel (82), as the dark object is included in the reconstruction. The second reconstruction matrix (84) uses the EAI technique of the present disclosure, reconstructing the sampling location from the three neighboring white pixels. EAI detects the object edge and omits the dark pixel, resulting in the correct white pixel reconstruction (85).

For a fixed, arbitrary coordinate $(x_r, y_r)$ in the target image $I_t(x, y)$, $d_t$ defines the location depth:

$$d_t = D_m[I_r(x_r, y_r)]$$

The target image coordinate $(x_r, y_r)$ warps to the reference image coordinate $(x_w, y_w)$.

For an m-sized neighborhood of points close to $(x_w, y_w)$, the set $N_S = \{(x_i, y_i) | 1 \le i \le m\}$. The weight for each of the neighbors is defined as:

$$w_i = f(d_t, D_m[I_r](x_i, Y_i))$$

Where $w_i$ is a function of the depth $(x_r, y_r)$ and the depth of the neighbor of $(x_w, y_w)$ corresponding to index i. The following equation represents an effective $w_i$ for a given threshold $t_e$:

$$1 | d_t - D_m[I_r](x_i, y_i) | < t_e$$

$$w_i = \{0 | d_t - D_m[I_r](x_i, y_i) | \ge t_e$$

The threshold $t_e$ is a feature size parameter. The weight function determines how to reconstruct $I_r(x_r, y_r)$:

$$I_r(x_r, y_r) = \text{Recon}(w_1 I_r(x_1, y_1), (w_2 I_r(x_2, y_2), \ldots (w_m I_r(x_m, y_m)))$$

The Recon function can be a simple modified linear interpolation, where the $w_i$ weights are incorporated with standard weighting procedures and re-normalized to maintain a total weight of 1.

The present disclosure also provides a performance-optimized decoding method for reconstructing the layered scene decomposition. Consider a display $D = (M_x, M_y, N_u, N_v, f, a, D_{LP})$ with a layered scene decomposition $L = (K_1, K_2, L^O, L^P)$ and an associated sampling scheme $S = (M_s, R)$. The elemental images are decoded by reconstructing the light fields $LF^O$ and $LF^P$ from deconstructed $LF^O$ and $LF^P$ light fields downsampled as specified by sampling scheme S. As noted above, particular implementations may restrict viewing to the inner frustum volume or the outer frustum volume of the light field display, thereby requiring the decoding of one of $LF^O$ or $LF^P$.

$LF^O$ can be reconstructed by decoding the elemental images specified by sampling scheme S. The ReconLF method for particular layers does not include inherent constraints regarding the order that the missing pixels of the missing elemental images are to be reconstructed. It is an object of the present disclosure to reconstruct missing pixels using a method that maximizes throughput; a light field large enough for an effective light field display requires an exceptional amount of data throughput to provide content at an interactive frame rate, therefore improved reconstruction data transmission is required.

The present disclosure introduces a basic set of constraints to improve pixel reconstruction with improved data transmission for content at an interactive frame rate. Consider a single light field $L_i \in L_o$ containing $M_x \times M_y$ elemental images, as input to ReconLF. The pixels (in other words, the elemental images) are reconstructed in two basic passes. Each pass operates in separate dimensions of the array of elemental images; the system executes the first pass as a column decoding, and the second pass as a row decoding, to reconstruct each of the pixels. While the present disclosure describes a system employing column decoding followed by row decoding, this is not meant to limit the scope and spirit of the invention, as a system employing row decoding followed by column decoding can also be utilized.

Figure 4:
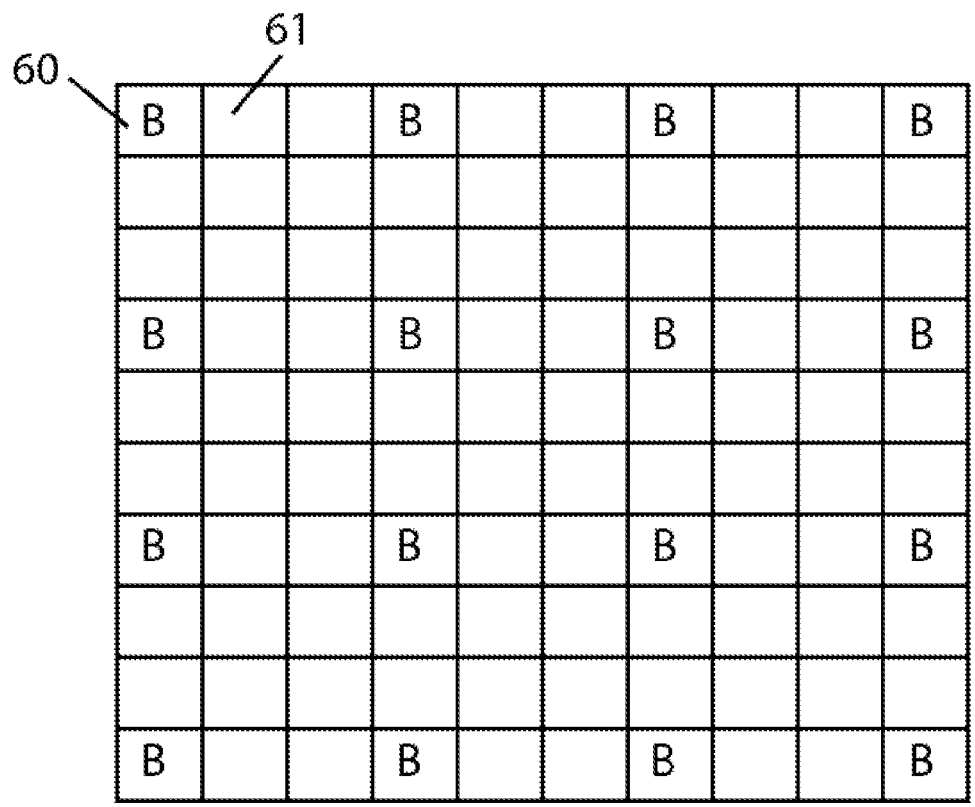
FIG. 4: illustrates schematically elemental images specified by a sampling scheme within a pixel matrix, as part of the image (pixel) reconstruction process according to the present disclosure.
Figure 5:
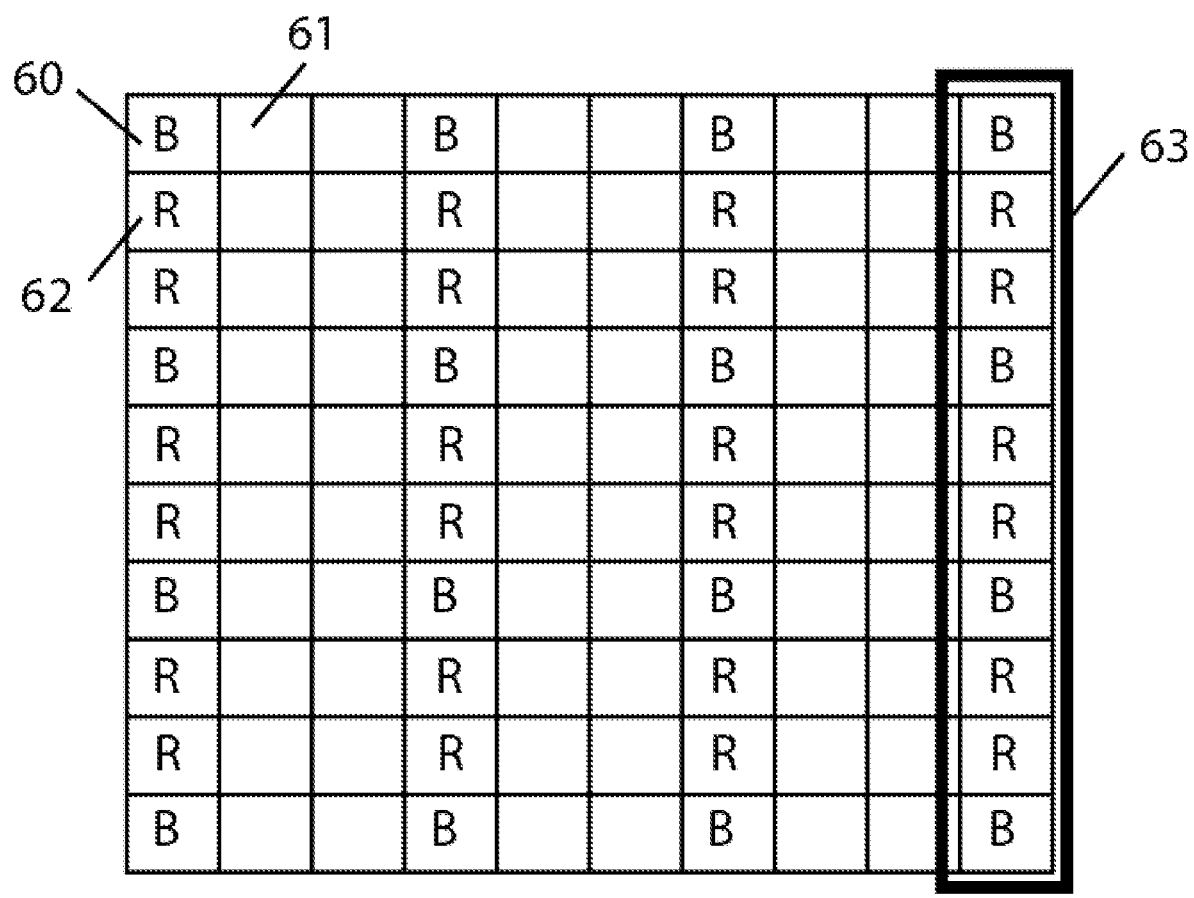
FIG. 5: illustrates schematically a column-wise reconstruction of a pixel matrix, as part of the image (pixel) reconstruction process according to the present disclosure.
Figure 6:
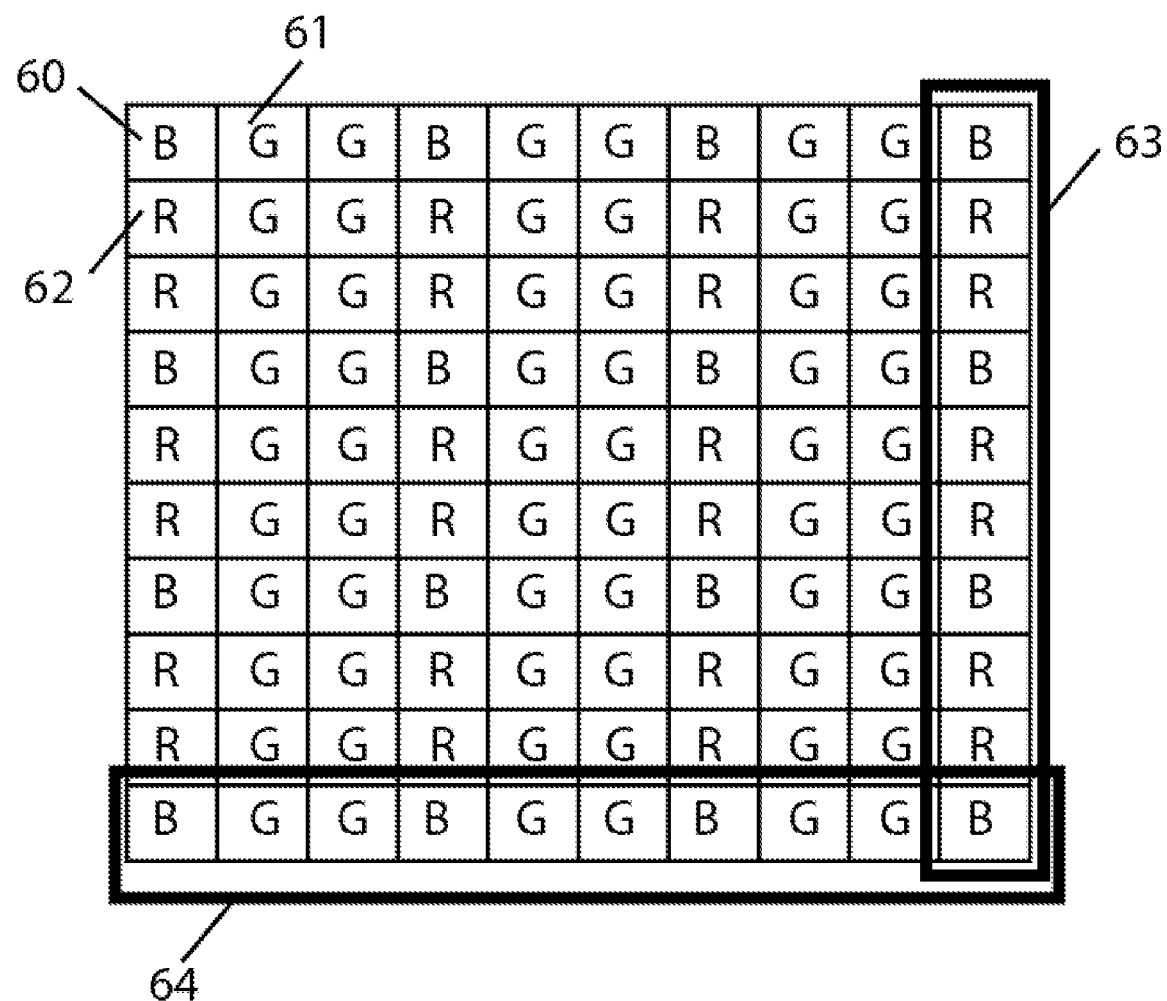
FIG. 6: illustrates a subsequent row-wise reconstruction of the pixel matrix, as part of the image (pixel) reconstruction process according to the present disclosure.

In the first pass, the elemental images specified by sampling scheme S are used as reference pixels to fill in missing pixels. FIG. 4 illustrates the elemental images in the matrix as B, or blue pixels. The missing pixels are synthesized strictly from reference pixels in the same column. These newly synthesized column-wise pixels are shown as R, or red pixels, in FIG. 5. Newly reconstructed pixels written to a buffer and act as further pixel references for the second pass, which reconstructs pixels reference pixels located in the same row as other elemental images. FIG. 6 illustrates these newly synthesized row-wise pixels as G, or green pixels.

In one embodiment a process for reconstructing a pixel array is represented by the following pseudocode algorithm:

Dimensional Decomposition Light Field Reconstruction:

Pass 1:
for each row of elemental images in $L_i$
  for each missing elemental image in the row
  for each row in elemental image
  load (cache) pixels from same row in reference images
for each pixel in missing row
  reconstruct pixel from reference information and write
Pass 2:
for each column of elemental images in $L_i$
  for each missing elemental image in the column
  for each column in elemental image
    load (cache) reference pixels from same column
  for each pixel in missing column
    reconstruct pixel from reference information and write This performance-optimized decoding method allows the row-decoding and column-decoding constraints to limit the effective working data set required for reconstruction operations.

To reconstruct a single row of a missing elemental image, the system only requires the corresponding row of pixels from the reference elemental images. Likewise, to reconstruct a single column of a missing elemental image, the system only requires the corresponding column of pixels from the reference elemental images. This method requires a smaller dataset, as decoding methods previously known in the art require entire elemental images for decoding.

Even when decoding relatively large elemental image sizes, the reduced dataset can be stored in a buffer while rows and columns of missing elemental images are being reconstructed, thereby providing improved data transmission.

Once all the rendered data has been decoded, and each of the plurality of inner and outer display volume layers are reconstructed, the layers are merged into a single inner display volume layer and a single outer display volume layer. The layered scene decomposition layers can be partially decompressed in a staged decompression, or can be fully decompressed simultaneously. Algorithmically, the layered scene decomposition layers can be decompressed through a front-to-back or back-to-front process. The final double frustum merging process combines the inner and outer display volume layers to create the final light field for the light field display.

To gain a better understanding of the invention described herein, the following examples are set forth with reference to the Figures. It will be understood that these examples are intended to describe illustrative embodiments of the invention and are not intended to limit the scope of the invention in any way.

EXAMPLES

Example 1: Exemplary Encoder and Encoding Method for a Light Field Display

The following illustrative embodiment of the invention is not intended to limit the scope of the invention as described and claimed herein, as the invention can successfully implement a plurality of system parameters. As described above, a conventional display as previously known in the art consists of spatial pixels substantially evenly-spaced and organized in a two-dimensional row, allowing for an idealized uniform sampling. By contrast, a three-dimensional (3D) display requires both spatial and angular samples. While the spatial sampling of a typical three-dimensional display remains uniform, the angular samples cannot necessarily be considered uniform in terms of the display's footprint in angular space.

In the illustrative embodiment, a plurality of light field planar-parameterized pinhole projectors provide angular samples, also known as directional components of the light field. The light field display is designed for a 640×480 spatial resolution and a 512×512 angular resolution. The plurality of planar-parameterized pinhole projectors are idealized with identity function α. The pitch between each of the plurality of planar-parameterized pinhole projectors is 1 mm, thereby defining a 640 mm×400 mm display screen. The display has a 120° FOV, corresponding to an approximate focal length f=289 μm.

This light field display contains 640×480×512×512=80.5 billion RGB pixels. Each RGB pixel requires 8 bits, therefore one frame of the light field display requires 80.5 billion×8×3=1.93 Tb. For a light field display providing interactive content, data is driven at 30 frames/s, requiring a bandwidth of 1.93 Tb×30 frames/s=58.0 Tb/s. Current displays known in the art are driven by DisplayPort technology providing maximum bandwidths of 32.4 Gb/s, therefore such displays would require over 1024 DisplayPort cables to provide the tremendous bandwidth required by interactive light field displays, resulting in cost and form-factor design constraints.

The illustrative embodiment delivers data to a light field display from a computer equipped with an accelerated GPU with dual DisplayPort 1.3 cables output. We consider a conservative maximum throughput of 40 Gb/s. The encoded frames must be small enough for transmission over the DisplayPort connection to a decoding unit physically located closer to the light field display.

The layered scene decomposition of the illustrative embodiment is designed to allow the required data throughput. With the dimensions defined above, the maximum depth of field of the light field display is $Z_{DOF}$=(289 microns)(512)=147968 microns=147.986 mm. The layered scene decomposition places a plurality of layered scene decomposition layers within the depth of field region of the light field display, ensuring that the distance of the layered scene decomposition layers from the display screen is less than $Z_{DOF}$. This illustrative example describes a light field display with objects located only within the inner frustum volumes of the display. This illustrative example is not intended to limit the scope of the invention, as the invention can successfully implement a plurality of system parameters, such as a light field display with objects located only within the outer frustum volume of the display, or a light field display with objects located within both the inner and outer frustum volumes of the display; embodiments limited to one frustum volume require a smaller number of layered scene decomposition layers, thereby marginally decreasing the size of the encoded light field to be produced.

The illustrative embodiment defines ten layered scene decomposition layers. When necessary, additional layered scene decomposition layers can be added to capture data that could be lost to occlusions, or to increase the overall compression rate. However, additional layered scene decomposition layers require additional computation from the decoder, thus the number of layered scene decomposition layers is carefully chosen. The illustrative embodiment specifies the ten layered scene decomposition layers from their front and back boundaries and assumes that the dividing planes of the layer are parallel to the display plane.

Each layered scene decomposition layer is located at a defined distance from the display plane, where the distances are specified in terms of multiples of focal length f, up to the maximum depth of field of 512f. Layered scene decomposition layers with a more narrow width are concentrated closer to the display plane, and the layer width (i.e., the depth difference between the front and back layer boundaries) increases exponentially by powers of 2 as the distance from the display plane increases. This embodiment of the invention is not intended to limit the scope of the invention, as other layer configurations can be implemented successfully.

The following table (Table 1) describes the layered scene decomposition layer configurations of the illustrative embodiment, and provides a sampling scheme based on plenoptic sampling theory to create sub-sampled layered scene decomposition layers:

TABLE 1

| Layer | Front boundary | Back boundary | Elemental image resolution | Maximum distance between sampled elemental images (sampling gap) | Elemental images sampled | Total data size required (24 bit color, 8 bits for depth/disparity) |
|---|---|---|---|---|---|---|
| 0 | 1 f | 1 f | 1 × 1 | 0 | 640 × 480 | 7.37 Mbits |
| 1 | 1 f | 2 f | 2 × 2 | 1 | 321 × 241 | 9.90 Mbits |
| 2 | 2 f | 4 f | 4 × 4 | 2 | 214 × 161 | 17.64 Mbits |
| 3 | 4 f | 8 f | 8 × 8 | 4 | 161 × 97 | 31.98 Mbits |
| 4 | 8 f | 16 f | 16 × 16 | 8 | 72 × 55 | 32.44 Mbits |
| 5 | 16 f | 32 f | 32 × 32 | 16 | 41 × 31 | 41.65 Mbits |
| 6 | 32 f | 64 f | 64 × 64 | 32 | 21 × 16 | 44.04 Mbits |

TABLE 1-continued

| Layer | Front boundary | Back boundary | Elemental image resolution | Maximum distance between sampled elemental images (sampling gap) | Elemental images sampled | Total data size required (24 bit color, 8 bits for depth/ disparity) |
|---|---|---|---|---|---|---|
| 7 | 64 f | 128 f | 128 × 128 | 64 | 11 × 9 | 51.90 Mbits |
| 8 | 128 f | 256 f | 256 × 256 | 128 | 6 × 5 | 62.91 Mbits |
| 9 | 256 f | 512 f | 512 × 512 | 256 | 4 × 3 | 100.66 Mbits |
| | | | | | Total: | 400.49 Mbits |

In the above table, layer 0 captures images that are to be displayed at the display screen plane, as in a conventional two-dimensional display known in the art. Layer 0 contains 640×480 pixels at a fixed depth, so it does not require any depth information. The total data size is calculated for each pixel with an RGB value and a depth value for 8 bits each (alternate embodiments may require larger bit values, such as 16 bits). In the illustrative embodiment, the elemental image resolution and sampling gap are calculated from the formulas described above, and the sampling scheme chosen reflects the elemental image resolution and sampling gap restrictions.

As described in the above table, the combined layered scene decomposition system has a total size of 400.5 Mb. Therefore, to produce data at a rate of 30 frames/s, a bandwidth of 30×0.4005=12.01 GB/s is required. This encoded form is sent over the dual DisplayPort 1.3 cables, along with additional information required to represent scene occlusions.

In the illustrative embodiment, the layered scene decomposition layers are configured by an encoder, efficiently implementing an oblique rendering technique to produce the layers located closer to the display plane (layers 0 to 5) and a perspective rendering technique to produce the layers located further away from the display plane (layers 6 to 9). Each elemental image corresponds to a single rendering view.

At layer 6, the number of separate angles to be rendered (64×64=4096) exceeds the number of views to be rendered (21×16=336); this signals the transition in efficiency between the oblique and perspective rendering methods. It should be noted that specific implementation aspects may provide additional overhead that skews the exact optimal transition point. For use with modern graphics acceleration techniques known in the art, perspective rendering can be efficiently implemented using geometry shader instancing. Multiple views are rendered from the same set of input scene geometry without repeatedly accessing the geometry through draw calls and without repeatedly accessing memory to retrieve the exact same data.

Figure 8:
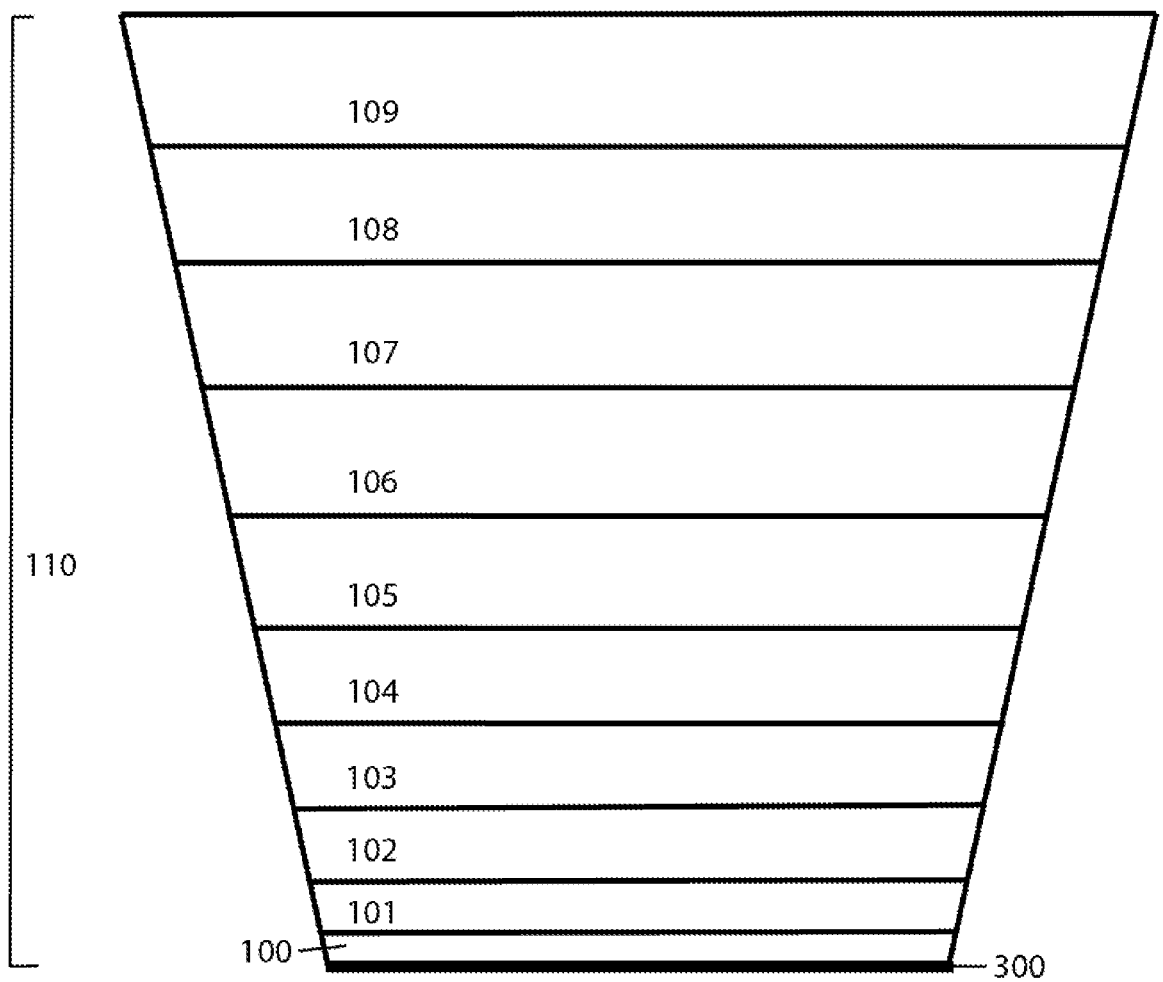
FIG. 8: illustrates schematically an exemplary layered scene decomposition of an image data set (a layering scheme of ten layers) correlating to the inner frustum light field of a display.

FIG. 8 illustrates the illustrative embodiment, with ten layered scene decomposition layers (100-109) in the inner frustum volume (110). The inner frustum volume layers extend from the display screen plane (300). The layers are defined as described in the table above, for example, the front boundaries of the inner frustum volume layer 0 (100) is 1f, inner frustum volume layer 1 (101) is 1f, inner frustum volume layer 2 (102) is 2f, inner frustum volume layer 3 (103) is 4f, and so on. Inner frustum volume layers 0 to 5 (100-105) and outer frustum volume layers 0 to 5 (200-205) are rendered with the oblique rendering technique, and outer frustum volume layers 6 to 9 (106-109) are rendered with the perspective rendering technique.

Figure 9:
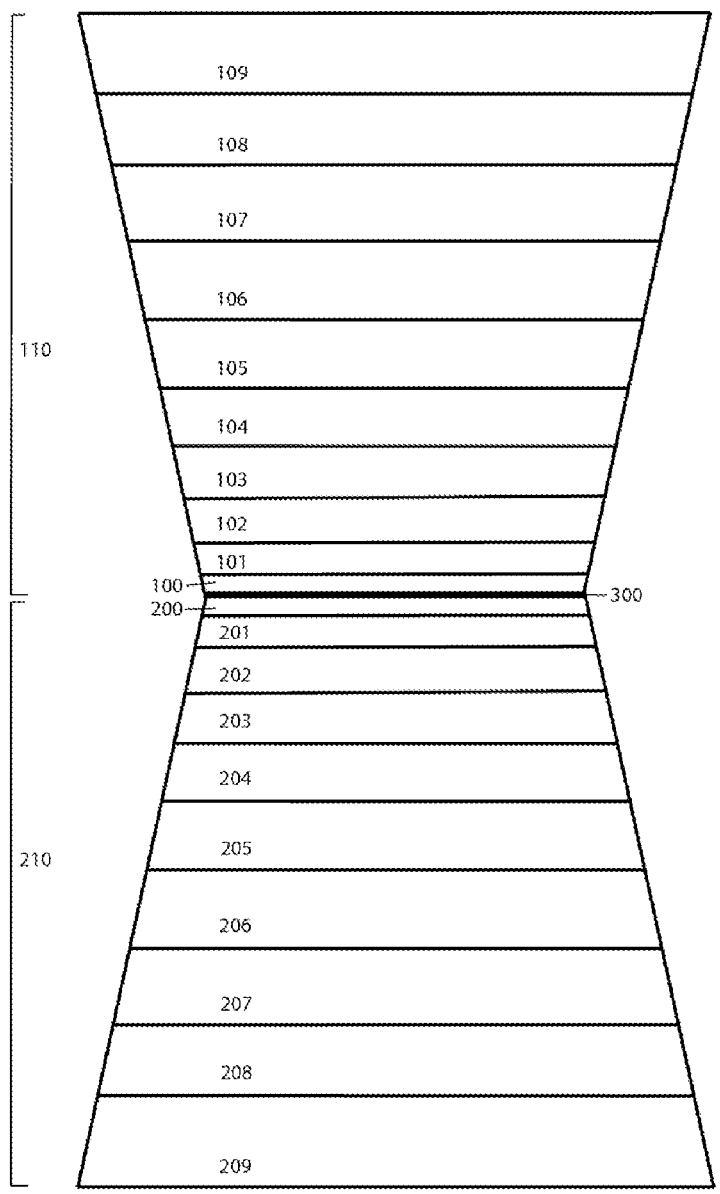
FIG. 9: illustrates schematically an exemplary layered scene decomposition of image data (two layering schemes of ten layers) correlating to the inner frustum and outer frustum light field regions, respectively, of a display.

FIG. 9 illustrates an alternate embodiment, with ten layered scene decomposition layers (100-109) in the inner frustum volume (110) and ten layered scene decomposition layers (200-209) in the outer frustum volume (210). The inner and outer frustum volume layers extend from the display screen plane (300). While the inner and outer frustum volume layers are illustrated as mirror images from each other, the inner and outer frustum volume may have differing numbers of layers, layers of different sizes, or layers of different depths. Inner frustum volume layers 0 to 5 (100-105) and outer frustum volume layers 0 to 5 (200-205) are rendered with the oblique rendering technique, and outer frustum volume layers 6 to 9 (106-109) and outer frustum volume layers 6 to 9 (206-209) are rendered with the perspective rendering technique.

An alternate embodiment can implement the system with a ray-tracing encoding based approach. Rendering a complete layered scene decomposition layer representation can require increased GPU performance, even with the optimizations described herein, as GPUs are optimized for interactive graphics on conventional two-dimensional displays where accelerated rendering of single views is desirable. The computational cost of the ray-tracing approach is a direct function of the number of pixels the system is to render. While the layered scene decomposition layer system contains a comparable number of pixels to some two-dimensional single view systems, the form and arrangement of said pixels differs greatly due to layer decomposition and corresponding sampling schemes. Therefore, there may be implementations where tracing some or all of the rays is a more efficient implementation.

Example 2: CODEC Decoder and Decoding Method for a Light Field Display

In the illustrative embodiment of the invention, the decoder receives the 12.01 GB/s of encoded core representation data, plus any residue representation data, from the GPU over dual DisplayPort 1.3 cables. The compressed core representation data is decoded using a customized FPGA, ASIC, or other integrated circuit to implement efficient decoding (residue representation data is decoded separately, as illustrated in FIG. 13). The 12.01 GB/s core representation is decompressed to 58 Tb/s for the final light field display. Note that this core representation does not include the residue representations necessary to render occlusions. The $$\frac{58 \ Tb/s}{12.01 \ GB/s}$$

provides a compression ratio of 4833:1; while this is a high performance compression ratio, the reconstructed light field data may still exhibit occlusion-based artifacts unless residue representation data is included in the reconstruction.

For the illustrative embodiment shown in FIG. 8, data is decoded by reconstructing individual layered scene decomposition layers and merging the reconstructed layers into an inner frustum volume layer. For an alternate embodiment, such as illustrated in FIG. 9, the data is decoded by reconstructing individual layered scene decomposition layers and merging the reconstructed layers into an inner frustum volume layer and an outer frustum volume layer.

A single layered scene decomposition layer can be reconstructed from given sampling scheme sampling of data using view synthesis techniques from the field of Image-Based Rendering which are known in the art. For example, Graziosi et al. specify using reference elemental images to reconstruct the light field in a single pass. This method uses reference elemental images offset from the reconstructed image in multiple dimensions. Because the elemental image data represents three dimensional scene points (including RGB color and disparity), pixels are decoded as a nonlinear function (although fixed on the directional vector between the reference and target elemental images), therefore requiring a storage buffer of equal size to the decoding reference elemental images. When decoding larger elemental images, this can create memory storage or bandwidth constraints, depending on the decoding hardware.

For a light field display with an elemental image size of 512×512 pixels with 24-bit color, a decoder requires a buffer capable of storing 512×512=262, 144 24-bit values (without disparity bits in this example). Current high-performance FPGA devices provide internal block memory (BRAM) organized as 18/20-bit wide memory and 1024 memory locations which can be used as a 36/40-bit wide memory with 512 memory locations. A buffer capable of reading and writing an image in the same clock cycle is large enough to hold two reference elemental images, as the nonlinear decoding process causes the write port to use a non-deterministic access pattern. Implementing this buffer in an FPGA device for a 512×512 pixel image requires 1024 BRAM blocks. Depending on the reconstruction algorithm used, multiple buffers may be required in each decoder pipeline. To meet the data rate of a high-density light-field display, the system may require more than one hundred parallel pipelines, which is magnitudes more pipelines than current FPGA devices. Because each buffer requires an independent read/write port, it may not be possible to implement such a system on current ASIC devices.

The present disclosure circumvents buffer and memory limitations by dividing the pixel reconstruction process into multiple, single-dimension stages. The present disclosure implements one dimensional reconstruction to fix the directional vector between the reference elemental images and the target to a rectified path. While reconstruction remains nonlinear, the reference pixel to be translated to the target location is locked to the same row or column location of the target pixel. Therefore, decoder buffers only need to capture one row or one column at a time. For the elemental image of 512×512 pixels with 24-bit color described above, the decoder buffer is organized as a 24-bit wide, 1024 deep memory requiring two 36/40×512 BRAM. Therefore, the present disclosure has reduced the memory footprint by a factor of 512, or multiple magnitudes. This allows a display pixel fill rate requiring over a hundred decoding pipelines to be supported by current FPGA devices.

Multi-stage decoding architectures require two stages to reconstruct the two dimensional pixel array in a light-field display. The two stages are orthogonal to one another and reconstruct rows or columns of elemental images. The first decoding stage may require a pixel scheduler to ensure that output pixels ordered to be compatible with the next stage input pixels. Due to the extremely high bandwidth required by each decoding stage, some output pixels from a previous stage may need to be reused to reduce local storage requirements. In this case, an external buffer can be used to capture all of the output pixels from a first stage so the subsequent decoding stage can efficiently access pixel data, reducing logic resources and memory bandwidth.

The present disclosure's multi-stage decoding with an external memory buffer allows the decoding process to transfer the required memory bandwidth from expensive on-die memory to lower cost memory devices such as double data rate (DDR) memory devices. A high performance decoding pixel scheduler ensures maximum reference pixel reuse from this external memory buffer, allowing the system to use narrower or slower memory interfaces.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

REFERENCE LIST

BANKS, MARTIN S., DAVID M. HOFFMAN, JOOHWAN KIM AND GORDON WETZSTEIN. "3D Displays" Annual Review of Vision Science. 2016. pp. 394-435.

CHAI, JIN-XIANG, XIN TONG, SHING-CHOW CHAN, AND HEUNG-YEUNG SHUM. "Plenoptic Sampling"

CLARK, JAMES J., MATTHEW R. PALMER AND PETER D. LAWRENCE. "A Transformation Method for the Reconstruction of Functions from Nonuniformly Spaced Samples" IEEE Transactions on Acoustics, Speech, and Signal Processing. October 1985. pp 1151-1165. Vol. ASSP-33, No. 4.

D O, MINH N., DAVY MARCHAND-MAILLET AND MARTIN VETTERLI. "On the Bandwidth of the Plenoptic Function" IEEE Transactions on Image Processing. pp. 1-9

GORTLER, STEVEN J., RADEK GRZESZCZUK, RICHARD SZELISKI, AND MICHAEL F. COHEN. "The Lumigraph" 43-52.

HALLE, MICHAEL W. AND ADAM B. KROPP. "Fast Computer Graphics Rendering for Full Parallax Spatial Displays"

JANTET, VINCENT. "Layered Depth Images for Multi-View Coding" Multimedia. pp. 1-135. Universite Rennes 1, 2012. English.

LEVOY, MARC, AND PAT HANRAHAN. "Light Field Rendering" SIGGRAPH. pp. 1-12.

MARSCHNER, STEPHEN R. AND RICHARD J. LOBB. "An Evaluation of Reconstruction Filters for Volume Rendering" IEEE Visualization Conference 1994.

PIAO, YAN, AND XIAOYUAN YAN. "Sub-sampling Elemental Images for Integral Imaging Compression" IEEE. pp. 1164-1168. 2010.

VETRO, ANTHONY, THOMAS WIEGAND, AND GARY J. SULLIVAN. "Overview of the Stereo and Multiview Video Coding Extensions of the H.264/MPEG-4 AVC Standard." Proceedings of the IEEE. pp. 626-642. April 2011. Vol. 99, No. 4.

WIDMER, S., D. PAJAK, A. SCHULZ, K. PULLI, J. KAUTZ, M. GOESELE, AND D. LUEBKE. "An Adaptive Acceleration Structure for Screen-Space Ray Tracing"

ZWICKER, M., W. MATUSIK, F. DURAND, H. PFISTER. "Antialiasing for Automultiscopic 3D Displays" Eurographics Symposium on Rendering. 2006.

We claim:

1. A computer-implemented method comprising the steps of:
   receiving a light field data set comprising a 3D description of a scene;
   partitioning the light field data set into a plurality of scene decomposition layers, each of the plurality of scene decomposition layers having depth boundaries relative to a display screen, each of the scene decomposition layers comprising a plurality of pixels each comprising a color and a disparity value in the layer;
   for each of the plurality of scene decomposition layers, encoding the layer by applying a disparity bit width to the layer and encoding each of the plurality of pixels in the layer using the disparity value and the disparity bit width in the layer to create a fixed point representation of the scene;
   sampling each of the scene decomposition layers;
   rendering each of the scene decomposition layers to produce a set of compressed data light field layers; and
   executing a view synthesis protocol comprising instructions for a multi-stage reconstruction of a pixel array from at least one reference elemental image in each scene decomposition layer to decode the compressed data light field layers and construct a subset of a plurality of light fields.

2. The method of claim 1, wherein the depth boundaries for each of the plurality of scene decomposition layers are defined by a front layer boundary, a back layer boundary, and a depth boundary value defined by the depth difference between the front layer boundary and the back layer boundary relative to the display screen.

3. The method of claim 1, wherein the disparity bit width encoding is the same for each of the plurality of scene decomposition layers.

4. The method of claim 1, wherein the disparity bit width is different for each layer.

5. The method of claim 1, wherein the method reduces transmission bandwidth by decreasing a width of a transmission depth channel.

6. The method of claim 1, wherein scene decomposition layers closer to the display screen have smaller depth boundary values than scene decomposition layer further from the display screen.

7. The method of claim 1, wherein scene decomposition layers closer to the display screen use a fixed point format, and scene decomposition layers further away from the display screen use a different fixed point format with a larger number of integer bits and a smaller number of fractional bits relative to scene decomposition layers closer to the display screen.

8. The method of claim 1, wherein scene decomposition layers closer to the display screen are rendered using an oblique rendering technique.

9. The method of claim 1, wherein scene decomposition layers further away from the display screen are rendered using a perspective rendering technique.

10. The method of claim 9, wherein the perspective rendering technique is implemented using geometry shader instancing.

11. The method of claim 1, wherein encoding the plurality of layered scene decomposition layers is implemented using ray-tracing.

12. The method of claim 1, wherein the multi-stage reconstruction of the pixel array is performed in a first stage by column decoding and in a second stage by row decoding.

13. The method of claim 1, wherein the multi-stage reconstruction of the pixel array is performed in a first stage by row decoding and in a second stage by column decoding.

14. The method of claim 1, further comprising transmitting the set of compressed data light field layers using a 2D display cable.

* * * * *